United States Patent
Govindachar

(10) Patent No.: US 12,430,267 B2
(45) Date of Patent: Sep. 30, 2025

(54) SYSTEM, DEVICE AND/OR METHOD FOR SERVICING REDIRECTED MEMORY ACCESS REQUESTS USING DIRECT MEMORY ACCESS SCATTER AND/OR GATHER OPERATIONS

(71) Applicant: Mercedes-Benz Group AG, Stuttgart (DE)

(72) Inventor: Suresh Govindachar, Milpitas, CA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 204 days.

(21) Appl. No.: 18/149,782

(22) Filed: Jan. 4, 2023

(65) Prior Publication Data
US 2024/0220431 A1    Jul. 4, 2024

(51) Int. Cl.
*G06F 13/28* (2006.01)
(52) U.S. Cl.
CPC .................................... *G06F 13/28* (2013.01)
(58) Field of Classification Search
CPC ....................................................... G06F 13/28
See application file for complete search history.

(56) References Cited

U.S. PATENT DOCUMENTS

| | | | | |
|---|---|---|---|---|
| 6,055,619 | A * | 4/2000 | North | G10H 7/002 712/35 |
| 7,877,524 | B1 | 1/2011 | Annem et al. | |
| 8,495,301 | B1 * | 7/2013 | Alexander | G06F 13/28 710/22 |
| 10,642,766 | B1 | 5/2020 | Kilsdonk | |
| 10,915,478 | B2 | 2/2021 | Chafin et al. | |
| 10,942,847 | B2 | 3/2021 | Khan et al. | |
| 11,003,606 | B2 | 5/2021 | Birsan et al. | |
| 11,855,898 | B1 * | 12/2023 | Baumann | H04L 69/22 |
| 2017/0153993 | A1 * | 6/2017 | Palmer | G06F 15/17375 |

FOREIGN PATENT DOCUMENTS

JP    2006323579 A    11/2006

* cited by examiner

*Primary Examiner* — Tammara R Peyton
(74) *Attorney, Agent, or Firm* — ANOVA LAW GROUP, PLLC

(57) ABSTRACT

Example methods, apparatuses, and/or articles of manufacture are disclosed that may be implemented, in whole or in part, in connection with processing signal streams. In one application, a direct memory access (DMA) controller may execute a gather operation based, at least in part, on one or more redirected write requests, to obtain one or more data items from a memory; transform the obtained data items to one or more addresses in the memory; and execute a scatter operation based on the one or more addresses.

20 Claims, 17 Drawing Sheets

370

372
receiving one or more scatter requests

374
loading one or more addressable lines of values and/or states from a memory to a buffer such that the loaded one or more addressable lines contain one or more unaddressable portions to be updated, the one or more unaddressable portions being identified in the one or more scatter requests

376
updating one or more values and/or states within at least one of the one or more unaddressable portions so as to modify one or more values and/or states of the loaded one or more addressable lines

378
initiating one or more operations to write the one or more modified addressable lines to the memory

552
associating data items of a plurality of signal streams from multiple sources based, at least in part, on attributes common to the data items 554
contemporaneously loading associated data items from the plurality of signal streams to one or more registers of a compute node 556
executing the compute node to process the loaded data items as operands to one or more computing operations

*FIG. 5B*

SYSTEM, DEVICE AND/OR METHOD FOR SERVICING REDIRECTED MEMORY ACCESS REQUESTS USING DIRECT MEMORY ACCESS SCATTER AND/OR GATHER OPERATIONS

BACKGROUND

1. Field

Subject matter disclose herein relates to processing signals received in streams from multiple data sources.

2. Information

Self-driving and/or automated driving applications, and other automotive and robotic applications, may rely on a fusion of signals, measurements and/or observations generated by multiple sensors. Processing for such applications may involve manipulation of arrays of data elements. Such applications may be executed and/or implemented by commercially available central processing units (CPUs) and/or graphics processing units (GPUs). Such commercially available processing units may be configured to manipulate elements of input arrays to generate elements of output arrays.

SUMMARY

One embodiment disclosed herein is directed to a system comprising: a memory, the memory comprising one or more memory devices; and a direct memory access (DMA) controller coupled to the memory by a bus, the DMA controller configured to: receive one or more redirected write requests; execute a gather operation based, at least in part, on the received one or more redirected write requests, to obtain one or more words from the memory; transform the one or more words obtained from execution of the gather operation to one or more addresses in the memory; and execute a scatter operation to write data items to the one or more addresses in the memory. In one particular implementation, the memory is a first memory, and the system further comprises a second memory operable/serving as a buffer, wherein the buffer is configured to store values and/or states retrieved from the first memory. The DMA controller may be further configured to parse the values and/or states in the buffer, to determine at least one address of the one or more addresses in the first memory. In one example, the DMA controller is further configured to apply one or more arithmetic operations to at least one of the parsed values and/or states to determine the at least one address.

In another particular implementation, the DMA controller is further configured to interpret the one or more redirected write requests as a request for a gather operation followed by a scatter operation. In yet another particular implementation, the DMA controller is further configured to form a request for the scatter operation for a redirected write request based, at least in part, on interpreting and/or transforming the data from a first gather operation into the one or more addresses in the memory to write the data to. In yet another particular implementation, the system further comprises an initiator configured to initiate the one or more redirected write requests, and wherein the DMA controller is configured to execute a first gather operation responsive to a signal from the initiator. The initiator of the one or more redirected read requests may comprise local memory or one or more registers of compute node that is configured to receive sensor measurements and/or observations as data items in a signal stream.

Another particular embodiment disclosed herein is directed to a method, at a direct memory access (DMA) controller, comprising: executing a first gather operation based, at least in part, on one or more redirected read requests; transforming one or more words obtained from execution of the first gather operation to one or more addresses; and executing a second gather operation to forward data items located at the one or more addresses to a destination determined based, at least in part, on the one or more redirected read requests. In one example, transforming the one or more words obtained from execution of the first gather operation to the one or more addresses further comprises parsing values and/or states in a buffer to determine a memory address. In another example, the method further comprises applying one or more arithmetic operations to the parsed values and/or states to determine the memory address.

In one particular implementation, the method further comprises interpreting the one or more redirected read requests as a first request for a gather operation of two requests for a gather operation. In another particular implementation, the method further comprises forming a request for a second of the two requests for a gather operation based, at least in part, on the one or more addresses determined from the results of the first gather operation. In yet another particular implementation, the method further comprises executing the first gather operation in response to a signal from an initiator of the one or more redirected read requests. In one example, the initiator of the one or more redirected read requests comprises a process executed by a compute node to execute one or more sensor fusion operations.

Another particular embodiment disclosed herein is directed to a system comprising: a memory, the memory comprising one or more memory devices; and a direct memory access (DMA) controller coupled to the memory by a bus. The DMA controller may be configured to: receive one or more redirected read requests; execute a first gather operation based, at least in part, on the received one or more redirected read requests, to obtain one or more words from the memory; transform one or more words obtained from execution of the first gather operation to one or more addresses; and execute a second gather operation to forward data items located at the one or more addresses to a destination determined based, at least in part, on the one or more redirected read requests.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIGS. 3B and 3D are flow diagrams of processes to facilitate scatter and gather operations, according to an embodiment;

FIG. 5B is a flow diagram of a method to process multiple data streams from an associated multiple sources, according to an embodiment;

Figure 1:
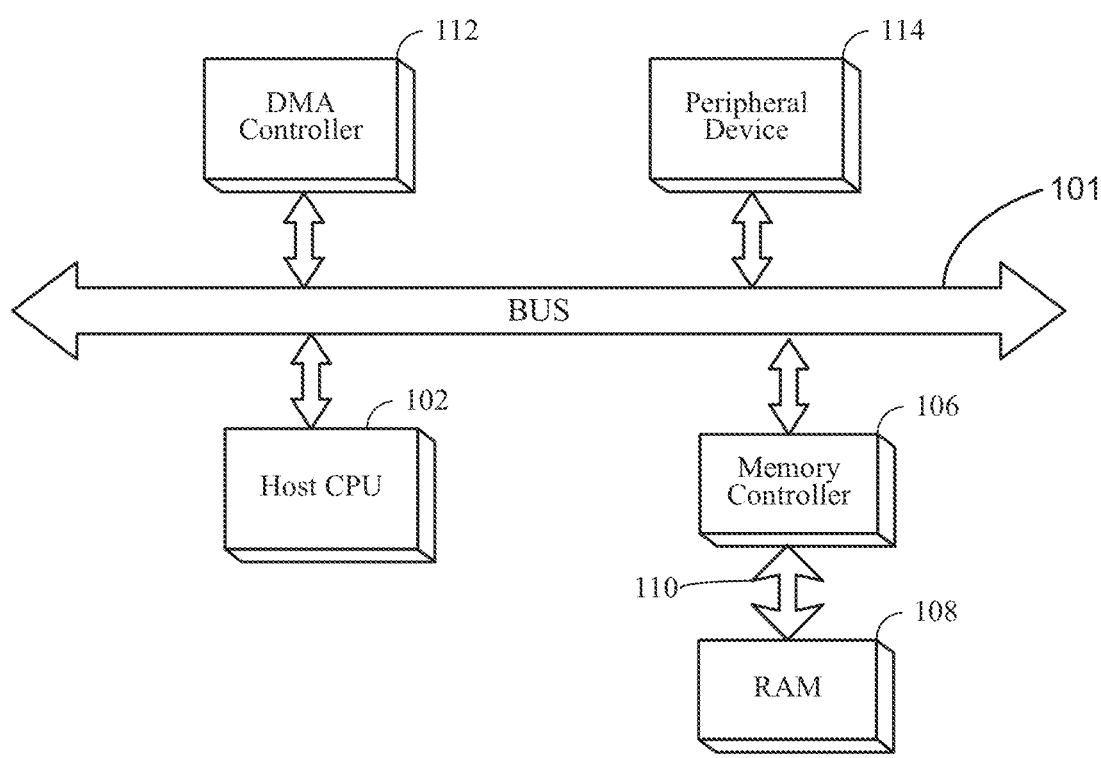
FIG. 1 is a schematic diagram of a computing device, according to embodiments.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

To facilitate an efficient processing of data items in one or more signal streams, a direct memory access (DMA) controller coupled to a memory by a bus may be configured to receive one or more redirected write requests. The DMA controller may execute a gather operation based, at least in part, on the received one or more redirected write requests, to obtain one or more words from the memory; transform the one or more words obtained from execution of the gather operation to one or more addresses in the memory; and execute a scatter operation to write data items at the one or more addresses in the memory that was determined by the transformation. In another embodiment, a DMA controller may process one or more redirected read requests by executing a first gather operation based, at least in part, on the one or more redirected read requests; transform one or more words obtained from execution of the first gather operation to one or more addresses; and executing a second gather operation to forward data items located at the one or more addresses determined by the transformation to a destination determined based, at least in part, on the one or more redirected read requests.

In some instances, a host central processing unit (CPU) may be part of a computing device in a vehicle, and may process data items in a memory for an automotive application. As an example, automotive applications such as self-driving/automated driving applications (e.g., fully autonomous, semi-autonomous, driver assistance systems, etc.) may employ a particle filter to fuse signal streams of sensor signals and/or observations to, for example, update particle filter states. Such applications may be implemented, for example, in systems such as automated machines (cars, trucks, etc.). In this context, a "signal stream" as referred to herein means a time varying progression of a sequence of encoded data items to be delivered to a recipient device over a signal transmission medium. Encoded data items (also referred to as data values) delivered in a signal stream may express attributes indicative of conditions and/or events, a subject identifier, a timestamp indicating a time of an event, metadata, just to name a few attributes that may be expressed in an encoded data item delivered in a signal stream. In a particular implementation, a signal stream may deliver sensor measurements and/or observations in combination with associated timestamps to indicate times that such measurements and/or observations are obtained.

In one aspect of an embodiment, information originating from different sources and arriving in respective signal streams may be processed as a "confluence" of information to determine a computed result. Such a confluence of information may be processed by associating and/or correlating information items from different sources by a particular attribute (e.g., time, space, reliability, confidence, etc.). Processing of the confluence of information may then include performing one or more operations on items based on one or more attributes to produce a result. In a particular implementation, data items in a confluence of information may be processed by updating one or more states of a particle filter. For example, such a particle filter may implement a processing of confluence of arrays of sensor signals/observations (e.g., received from signal streams) to update states of measurement-particles, filter-particles, static-particles and/or dynamic-particles. In an implementation, measurements and/or observations in a confluence of arrays of measurements may be generated from different sensors. Such measurements and/or observations generated by different sensors may nonetheless be associated and/or correlated by time and space. According to an embodiment, associating data items from different sources in a confluence of arrays may be implemented at least in part using a radix sort applied to an array of keys. In a particular implementation, sensor signals and/or observations may be formatted in arrays that are to be processed to generate a confluence of arrays. An example procedure to generate such a confluence of arrays may be executed according to the following pseudocode:

```
// Number of input streams, S_in[ ] is k
// Number of output arrays, S_out[ ] is l
// Pseudo code that takes in S_in[ ] and some parameters
// and outputs S_out[ ] in_index[0...(k-1)] = 0
out_index[0...(l-1)] = 0 parameters[ ]
while(1){ count = 0
value_in[0...(k-1)] = 0
value_out[0...(l-1)] = 0
for(i: 0..(k-1)){
if(is_valid(in_index[i], i, parameters)){ value_in[i] = S_in[i][in_index[i]]
count++
}
}
if(count == 0){break}
(value_out[ ], s_out_enable[ ]) = f(value_in[ ], parameters) for(i: 0..(l-1)){
if(s_out_enable[i]{ s_out[i][out_index[i]] = value_out[i] out_index[i]++
}
}
// typically, addition below is saturating in_index[ ] += read_next(value_in[ ],
parameters)
// typically, read_next( ) returns 0, 1, or N[ ]
}
```

According to an embodiment, a confluence of multiple signal streams may comprise a mapping of data items in different input signal streams to data items in one or more output signal streams. For example, data items in such an input signal stream may comprise sensor measurements and/or observations of a sensor associated with the input signal stream. Thus, a confluence of such input signal streams may comprise a mapping of sensor measurements and/or observations (e.g., from different/distinct sensors associated with the input signal streams) to data items of an output signal stream. Such data items of the output signal stream may comprise values inferred/computed based on the sensor measurements and/or observations. In the pseudocode example provided above, a number of input signal streams may be defined as S_in[ ] (containing data items value_in[ ]) and a number output signal streams may be defined as S_out[ ] (containing data items value_out[ ]). Here, expression "(value_out[ ], S_out_enable[ ])=f(value_in[ ], parameters) for(i: 0 . . . (l-1))" may map data items value_in[ ] in input signal streams S_in[ ] to data items value_out[ ] in output signal stream S_out[ ] according to function f( ).

According to an embodiment, a computing device, circuitry and/or logic may form a "Confluence Engine" (CE), also referred to as a "Confluencer" and/or "Confluence Processor" (CP), to process a confluence of data items as discussed above. Such a confluence of data items may include, e.g., a confluence of signal streams and/or a sequence of confluences of signal streams with a reduced latency and/or reduced computing resources (e.g., power, memory, etc.). In a particular implementation, an output of a confluence operation of such a CE may provide all or a portion of an input to a subsequent confluence operation. Characteristics of a confluence, such as a function like k, f( ), read_next( ) as shown in the pseudocode example above, may be part of a run-time programming of a CE.

According to an embodiment, a CE may employ a direct memory access (DMA) sub-system, which may comprise a DMA controller (also referred to as a DMA "engine(s)") that is configurable to initiate read operations and write operations between a line accessible memory and a transport memory, for example. A particular process by which a CE accesses memory may be determined in parametric form at compilation time and in physical form at run time. As such, in a particular implementation, events triggering execution of a DMA controller may not be limited to events occurring at an arithmetic logic unit (ALU) (e.g., from loads and stores in an ALU). A DMA controller may be triggered to execute DMA transactions by a start of a confluence operation. The DMA controller may then execute such DMA transactions independently of arithmetic logic units (ALUs) (e.g., dependent solely upon an availability of read and write access at the effective end points of such DMA transactions).

FIG. 1 is a schematic diagram of a system 100 to execute DMA transactions. The system 100 includes multiple components communicating via a bus 101. The components include a host CPU 102, a memory controller 106, a RAM 108 (which may form a main system memory), a peripheral device 114, and a DMA controller 112. In this context, "direct memory access" as referred to herein means a process executed by one or more hardware subsystems and/or circuits to access a particular memory independently of a particular processing unit and/or central processing unit (e.g., independent of the host CPU 102). According to an embodiment, DMA controller 112 may initiate operations to access (e.g., read access or write access) random access memory (RAM) 108 through bus 101 independently of host CPU 102. For example, DMA controller and/or engine 112 may control and/or execute transactions to transfer data items (also referred to as data values) between peripheral device 114 and RAM 108 (through memory controller 106) independently of action by host CPU 102. Such a DMA transaction may be triggered by a signal, condition, and/or event (e.g., interrupt signal), for example.

Figure 2A:
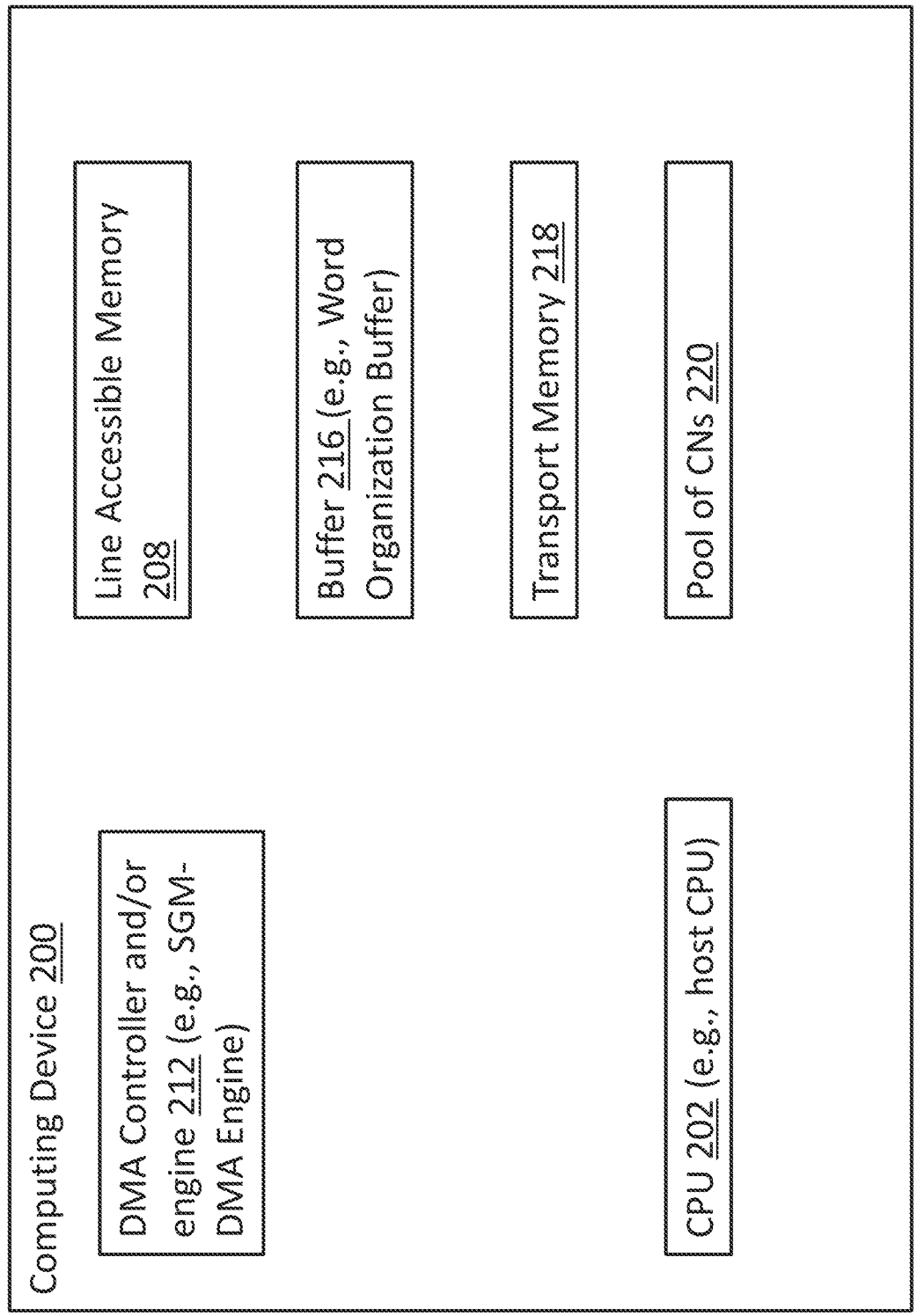
FIGS. 2A and 2B are schematic diagrams of a computing device comprising a direct memory access (DMA) controller and/or engine including a buffer, according to an embodiment.
Figure 2B:
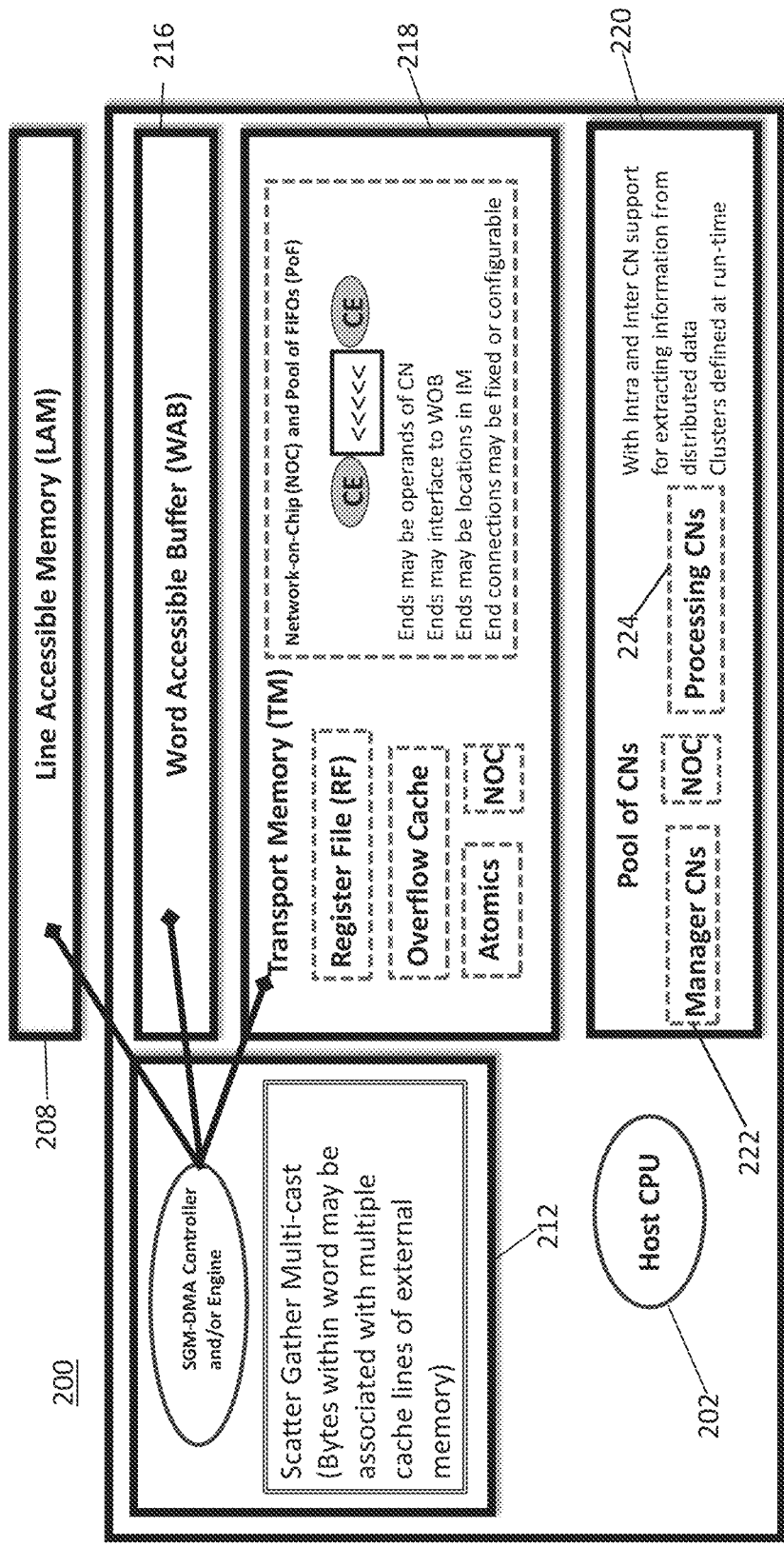

As discussed above, the processing of data items for automotive applications or other computing applications may be enhanced through a confluence engine (CE). FIGS. 2A and 2B are schematic diagrams of a computing device 200 comprising a direct memory access (DMA) controller 212 (also referred to as a DMA engine 212) and a buffer 216 to implement one or more aspects of a CE, according to an embodiment. The computing device 200 may be or may form, e.g., a system-on-chip (SoC), micro-chip, control circuit, or some other computing device. In some implementations, the computing device 200 may form a vehicle controller, such as an advanced driver assistance system (ADAS) device, a telematics control unit (TCU), an electronic control unit (ECU), a centralized vehicle computer, or some other vehicle controller. As illustrated in FIGS. 2A and 2B, the computing device 200 may further include a CPU 202 (also referred to as a host CPU), a transport memory 218, a line accessible memory 208, a buffer 216, and a pool of compute nodes (CNs) 220 (also referred to as CN pool 220).

In one implementation, a CN may comprise a single processing circuit core capable of executing operations to map input operands to output computing results. In another implementation, a CN may comprise multiple distinct processing cores to execute operations to map input operands to output computing results. In another implementation, two or more non-concurrently executing CNs may be implemented on the same processing circuit core. For example, a processing circuit may implement a first CN to generate an output result (e.g., stored in transport memory 218) that is to be an input to a second, subsequently executing CN implemented on the same processing circuit.

A CN in pool of CNs 220 may comprise a dedicated local memory (e.g., static random access memory (SRAM)) and general registers to receive operands for operations to be executed and/or to provide results from execution of operations. In this example, the host CPU 202 may use transport memory 218 to store data items, and may control CNs in the CN pool 220 to perform operations on these data items. The transport memory 218 may be physically closer to the CNs, and/or may operate with lower access latency, and thus may be used as a cache to store the data items. The line accessible memory 208 may be external to the transport memory 218, and may provide a larger amount of memory space relative to the transport memory 218, but may be physically farther from the CN pool 220, and may operate with longer access latency. According to an embodiment, the transport memory 218 may comprise one or more synchronization mechanisms to facilitate inter CN communication between and/or among CNs in CN pool 220 (e.g., for synchronization of communications between CNs having different execution latencies). In a particular implementation, line accessible memory 208 may be separated from transport memory 218, CPU 202, and buffer 216 by a bus (not shown). According to an embodiment, buffer 216 may be formed in circuitry to implement a core circuit of DMA controller and/or engine 212 such that buffer 216 is distinct and separate from circuitry to form transport memory 218. Such formation of buffer 216 in a core circuit of DMA controller and/or engine 212 may reduce and/or minimize latencies associated with loading data items to buffer 216 and storing data items from buffer 216 in the course of executing DMA operations.

In an embodiment, the DMA controller and/or engine 212 may be configured to interface with the transport memory 218 and the line accessible memory 208. The transport memory 218 and/or line accessible memory 208 may also be cache-line addressable. In other words, the line accessible memory 208 in this example may be a cache line addressable memory. The transport memory 218 and/or line accessible memory 208 may provide data items (also referred to as data values) which a CN in the pool of CNs 220 may manipulate, operate on, or otherwise process. According to an embodiment, all or a portion of transport memory 218 may be organized as cache that may be integrated with commercially available components. It should also be noted that caches, either in transport memory 218 or in buffer 216, may mitigate manufacturing defects and/or enable use of embodiments with larger than anticipated application sizes.

In one implementation, the DMA controller and/or engine 212 may be configured to handle cache-line sized data items (e.g., 64-bytes or 128-bytes) where, even in scatter-gather operations, such data items are locatable and accessible by cache-line addresses. Such a cache-line address for a 64-byte cache-line may be expressed in a binary notation ending with six zeros. Likewise, a cache-line address for a 128-byte cache-line may be expressed in a binary notation ending with seven zeros. According to an embodiment, DMA controller and/or engine 212 may be configured to handle word-sized data items, even while line accessible memory 208 may continue to be addressable only at cache lines. Transport memory 218 may be organized as a cache, a word-addressable register, or a collection of transport memory buffers such as word-wide first-in first-out (FIFO) buffers, or a combination thereof. In one implementation, such a transport memory buffer in transport memory 218 may comprise circuitry and/or a device specifically designed to function as a FIFO buffer. In other implementations, such a transport memory buffer in transport memory 218 may comprise a static random access memory (SRAM) device or a network-on-chip (NOC) device specifically configured to function as a FIFO buffer. To facilitate a scatter operation or gather operation to transfer word-sized data items to and from line accessible memory 208, the DMA controller and/or engine 212 may implement a buffer 216 (e.g., located between line accessible memory 208 and transport memory 218). The buffer 216 may be configurable to store together bytes from multiple cache lines to be placed into a destination word in transport memory 218. DMA controller and/or engine 212 may also be capable of executing multi-casting write operations in either direction (e.g., in a direction from transport memory 218 to line accessible memory 208, or in a direction from line accessible memory 208 to transport memory 218). Buffer 216 may be distinct/different from transport memory 218 and memory DMA controller and/or engine 212. As discussed herein, buffer 216 may be formed in a client core to implement DMA controller and/or engine 212.

In this context, a "transport memory" as referred to herein is to mean circuitry to facilitate communication of data items between and/or among CNs such as CNs in pool of CNs 220. In one particular implementation, such a transport memory may transport results from execution of a first operation at a first CN to be input operands of a second operation to be executed at a second CN (e.g., in a computing pipeline). In a particular implementation, transport memory 218 may be organized as a static random access memory (SRAM) device used as access-controlled memory or shared memory as cache memory, word-addressable or SIMD-vector addressable register files, or circuitry and/or a device specifically structured to function as first-in first-out (FIFO) buffers. Such circuitry and/or device specifically structured to function as FIFO buffers may have a width that is word-wide or single instruction, multiple data (SIMD)-vector wide or circuitry or a network-on-chip (NOC) device coupled between endpoints, or a combination thereof, just to provide a few examples.

As stated above, CNs in CN pool 220 (e.g., a pool of CNs) may operate on data items read from memory. In this context, a "compute node" as referred to herein is to mean an identifiable and distinct set of computing resources (e.g., hardware and executable instructions) that is configurable to execute operations to process input values to provide output values. CNs in pool of CNs 220 may comprise scalar CNs and/or processing circuit cores to implement arithmetic logic units (ALUs), digital signal processors (DSPs), vector CNs, VLIW engines or field programmable gate array (FPGA) cells, or a combination thereof, just to provide a few examples of particular circuit cores that may be used to implement CNs in pool of CNs 220. CN pool 220 may be implemented according to various architectures. For example, CN pool 220 may comprise one or more CNs implemented according to a reduced instruction set computing (RISC) architecture, a complex instruction set computing (CISC) or very long instruction word (VLIW) architecture, or some combination of these types, in full-featured or simplified form. CNs in CN pool 220 may also comprise a combination of scalar, SIMD or multiple instruction and single data stream (MISD) ALUs.

According to an embodiment, features of computing device 200 may include commercially available features such as, for example, transport rings, clos networks, shuffle circuitry, for example. The pool of CNs 220 may facilitate multi-threading in CNs, clustering of CNs, mail-boxes, interrupts, features for synchronizing among CNs, atomic operations at locations in the transport memory 218, features added to meet safety and security requirements, just to provide a few examples.

In particular implementations, a clustering of CNs within CN pool 220 may be formed based, at least in part, on a trade-off of resources, and may be permanently defined in an integrated circuit (IC) device. In certain embodiments depending on how CN pool 220 is to be configured, two of the same integrated circuit (IC) device may implement a different clustering of associated CNs. For example, a processor configuration may define a processing of multiple confluences with a clustering of CNs based, at least in part, on associated confluences to be executed. Each associated cluster may, for example, process a confluence of arrays such that an output of one cluster provides an input to one or more other clusters.

According to an embodiment, the transport memory 218 may form one or more buffers, including one or more first-in-first-out (FIFO) buffers. The one or more FIFO buffers may comprise a "vertical" FIFO buffer. Such vertical FIFO buffers may be buffers that have an endpoint that interfaces with the DMA controller and/or engine 212 (such an endpoint may be referred to as an "outer" endpoint), and another endpoint that forms registers which may provide data items usable as operands of a CN in pool of CNs 220 (such an endpoint may be referred to as an "inner" endpoint). Inner endpoints of the vertical FIFO buffer may be shared by multiple CNs in pool of CNs 220. If such an inner endpoint comprises a FIFO-out end (that is, an outbound end of the FIFO buffer), for example, a broadcast to multiple CNs in pool of CNs 220 may be achieved. If such an inner endpoint comprises a FIFO-in-end (that is, an inbound end of the FIFO buffer), hardware locks and/or instructions executing on a CN in pool of CNs 220 may prevent race conditions. In some implementations, a FIFO buffer formed in transport memory 218 may also comprise a "horizontal" FIFO buffer. The horizontal FIFO buffer may be a buffer that has two endpoints which provide data items as operands of different CNs in pool of CNs 220 or just provide data items to locations of transport memory 218. It should be noted that FIFO buffers formed in the transport memory 218 may provide a transparent block and release mechanism for instances during which input and output speeds differ. If an outer endpoint of a FIFO buffer of transport memory 218 is a register or an operand that some CN in the pool of CNs 220 is to consume/process, and if the CN is slow to do so, the DMA controller and/or engine 212 may eventually execute a block mechanism. Conversely, if the DMA controller and/or engine 212 is slow to write to such a FIFO buffer in transport memory 218, a CN in pool of CNs 220 may eventually execute a block mechanism. Similar transparent block and release mechanisms may exist if FIFO buffers are implemented between and/or among CNs and/or between and/or among locations in transport memory 218.

In an IC device, if the transport memory 218 forms FIFO buffers, circuitry at end-points of the FIFO buffers may be permanent or may be configurable (via internal FPGA circuitry, for example). Particular implementations may include segments of vertical FIFO buffers and horizontal FIFO buffers formed in IC device circuitry. Such buffer circuitry may have endpoints that are configurable at runtime to be from among at least one of: operands or registers of CNs in pool of CNs 220, interface to buffer 216, locations in transport memory 218, and endpoints of other FIFO buffers of transport memory 218. If endpoints of a FIFO buffer of transport memory 218 are operands or registers of CNs in the pool of CNs 220, such FIFO buffer endpoints may be shared among multiple CNs in the pool of CNs 220.

According to an embodiment, a CN in pool of CNs 220 may receive an operand for a computing operation either from registers of a register file, from FIFO buffers of transport memory 218, and/or from special constant and parameter registers (which may comprise shared registers), for example. In some instances, a portion of the register file may be shared among multiple CNs in the pool of CNs 220. Within computing device 200, the host CPU 202 may also be capable of accessing the constant and parameter registers. The host CPU 202 may provide host functionalities such as, for example, launching of confluence operations to be performed after having completed configuration tasks. Such configuration tasks may include defining clusters of CNs in pool of CNs 220, configuring inter-CN communication, configuring the width and depth of FIFO buffers of transport memory 218, configuring the endpoints of FIFO buffers of transport memory 218, defining manager CNs in pool of CNs 220 and the CN clusters in pool of CNs 220 manager CNs are to manage, setting up the DMA controller and/or engine 212, setting up atomics, setting up communication and synchronization resources, monitoring the termination of confluences, just to provide a few examples.

In an embodiment, the buffer 216 may facilitate processing of confluences in multiple aspects. In one such non-limiting aspect, an input signal stream in a confluence may comprise an "indirection stream" (e.g., a collection of addresses in line accessible memory 208 to be read). In such cases, such an indirection signal stream may not be fed directly to a CN in the pool of CNs 220, but instead may be provided to DMA controller and/or engine 212 while DMA controller and/or engine 212 may transport a signal stream of read data items to the CN. In other words, a latency of access by random read operations (random reads of lines or random reads of words or random indirect reads of lines or words or combinations thereof) may be hidden by extracting a pattern of random accesses, building up an access list of significant length, and performing the necessary extraction and indirection at the DMA controller and/or engine 212 itself. In other cases, an input signal stream may comprise a "double indirection stream" in which a signal stream may contain addresses, with data items at these addresses providing further indirection, after some processing. In a particular implementation, a first level of indirection of a double indirection stream may be read and used multiple times. In a sensor fusion application, multiple confluences may be configured where initial confluences may build (e.g., in transport memory 218 itself) with a look-up table (LUT) for data items of a first level of indirection and data items of a second level of indirection. It should be understood, however, that these examples are not limiting.

According to an embodiment, some processing within a confluence of signal streams (e.g., within the f( ) and read_next( ) in the pseudocode example above) may be viewed as an extraction of information from data items distributed across CNs in the pool of CNs 220. One example of such an extraction is provided in Table 1 below.

TABLE 1

| | segment key | | | | | | | | | |
|---|---|---|---|---|---|---|---|---|---|---|
| | 6 | 6 | 6 | 3 | 3 | 7 | 7 | 7 | 7 | 8 |
| value | 4 | 2 | 2 | 1 | 3 | 3 | 2 | 2 | 1 | 5 |
| minimum | 1 | 1 | 1 | 1 | 1 | 1 | 1 | 1 | 1 | 1 |
| maximum | 5 | 5 | 5 | 5 | 5 | 5 | 5 | 5 | 5 | 5 |
| segmented min | 2 | 2 | 2 | 1 | 1 | 1 | 1 | 1 | 1 | 5 |
| segmented max | 4 | 4 | 4 | 3 | 3 | 3 | 3 | 3 | 3 | 5 |
| segment first | 1 | 0 | 0 | 1 | 0 | 1 | 0 | 0 | 0 | 1 |
| segment last | 0 | 0 | 1 | 0 | 1 | 0 | 0 | 0 | 1 | 1 |
| segment count | 3 | 3 | 3 | 2 | 2 | 4 | 4 | 4 | 4 | 1 |
| reduction | 25 | 25 | 25 | 25 | 25 | 25 | 25 | 25 | 25 | 25 |
| segmented reduction | 8 | 8 | 8 | 4 | 4 | 8 | 8 | 8 | 8 | 5 |
| inclusive scan (is) | 4 | 6 | 8 | 9 | 12 | 15 | 17 | 19 | 20 | 25 |
| exclusive scan (es) | 0 | 4 | 6 | 8 | 9 | 12 | 15 | 17 | 19 | 20 | 25 |
| segmented is (sis) | 4 | 6 | 8 | 1 | 4 | 3 | 5 | 7 | 8 | 5 |
| segmented es (ses) | 0 | 4 | 6 | 8 | 0 | 1 | 4 | 0 | 3 | 5 | 7 | 8 | 0 | 5 |

According to an embodiment, results may be provided by CNs in the pool of CNs 220 operating cooperatively using operations such as shifts, shuffle, broadcast, and multi-cast of operands among participating CNs, just to provide a few examples. Such features may be present intra-CN, e.g., present for word-operands of a SIMD-vector CN in pool of CNs 220. Pool of CNs 220 may be configured to have such features for inter-CN communication via configurable bridge circuitry between CNs. Such circuitry may be hard-wired or configurable at runtime.

According to an embodiment, CNs in a pool of CNs 220 (e.g., configured in CN clusters) may be configured for specialized processing functions. In a particular implementation, such specialized CNs in the pool of CNs 220 may facilitate management of processing flow of an application. For example, the pool of CNs 220 may include one or more processing CNs 224 and one or more manager CNs 222. The processing CNs 224 may perform processing operations on, e.g., sensor observations, measurements, and/or other signals. In this example, the manager CNs 222 may manage different sets of processing CNs 224. The processing CNs 224 may communicate with the one or more manager CNs 222. In some instances, a manager CN 222, based on communications from processing CNs 224, may provide information to processing CNs 224. The processing CNs 224 may continue their processing as qualified by information provided by manager CN 222. In some implementations, the manager CNs 222 may comprise physically separate processing CNs 224, or just specialized circuitry formed within processing CNs 224.

It should be noted that rates at which different individual signal streams of a confluence (e.g., from different sources such as different sensors) are generated and consumed (e.g., processed) may not necessarily be equal. A rate at which such a signal stream is consumed or generated may be determined by, for example, characteristics of an operation, such as the function f( ) (in pseudocode example above). For example, a rate at which a signal stream of measurements and/or observations of a sensor for a sensor fusion operation may be computed/generated by function f( ). Such a sensor fusion operation may involve an inverse sensor model that results in outputting a signal stream that is longer than an input signal stream. For processing a confluence of longer signal streams, for example, an output rate may be matched to a bandwidth/throughput of line accessible memory 208. Configuring an output of one CN to be an input to another CN may assist with load balancing, for example.

According to an embodiment, the computing device 200 may enable deployment of advanced sensor fusion operations to update a particle filter state (e.g., in automated driving or other motor vehicle applications) while consuming very little power. In one application, instances of computing device 200 may be implemented as a sequence of pipelined stages, for example. For such applications, features of a computing device 200 may be configured at time of use to have different amounts of resources allocated to different pipeline stages. Exchanges of data items between and/or among pipeline stages and line accessible memory 208 may be synchronized transparently (e.g., without mutexes, spin-locks and such) by the use of FIFO buffers (e.g., FIFO buffers formed in transport memory 218).

In another embodiment, computing device 200 may be configurable to optimize for power, space, and/or performance (e.g., accuracy and/or latency). While features of computing device 200 may be adapted to implement a CE, features of computing device 200 may be adapted to other applications including, for example, applications that rely on random access to line accessible memory 208. Features of computing device 200 may also implemented in so called "super-computers." In the context of super-computers, a low power feature of computing device may assist with overcoming power constraints that may preventing realization of an Exascale super-computer, for example. Additionally, circuitry to implement computing device 200 may incorporate safety and security features in a manner to meet requirements of an embedded computing device. With computing device 200 having a small physical size and low power consumption, use of computing device 200 may not necessarily be restricted to use as an external accelerator integrated circuit (IC) device, but may also be incorporated at a sub-system within an automotive-grade system-on-chip (SOC) IC device.

In one aspect, for example, computing device 200 may comprise a particular arrangement and/or configuration of CNs (e.g., a pool of CNs 220), transport memory 218, and/or DMA controller and/or engine 212. Computing device 200 may be configurable to provide a network of CNs and memory elements adapted to a particular type of computation, such as a particular application for processing signal streams (e.g., carrying measurements and/or observations from sensors). In an implementation, such a network of CNs and memory elements may enable a simultaneous processing of multiple signal steams at a high throughput and low latency. Such a network of CNs and memory elements may be implemented, at least in part, using implementation of intra-device communication protocols (e.g., AXI) over physical connections and FIFO buffers. As pointed out above, an end point of a FIFO buffer may comprise an addressable memory location or a register to receive an operand (e.g., general register of an ALU configured as a compute node as an operand for a computing operation) or a result computed by a CN, for example. A pool of FIFO buffers, for example, may comprise end points configurable to be associated with various CNs or memories.

In one aspect, particular embodiments disclosed herein are directed to so-called vectored input/output (I/O) operations including "scatter" operations and "gather" operations. Such vectored operations may, for example, enable high throughput transfer of large amounts of data into or out of a physical memory (e.g., multiple addressable lines of memory in line accessible memory 208) with a single request or command to enhance efficiency and convenience. For example, a gather operation may entail sequentially reading of data from multiple memory locations (e.g., buffers) and writing the read data to a signal stream or contiguous portion of memory in a single transaction. In an implementation, DMA controller and/or engine 212 may execute a gather operation to service a gather request (e.g., originating at an application) that specifies multiple memory locations which are not necessarily line-aligned from which data items are to be read and a destination (e.g., memory address) for storing the read items. On the other hand, a scatter operation may entail a reading of data items from a signal stream or contiguous memory, and writing the read data items to multiple different memory locations which are not necessarily line-aligned. In an implementation, DMA controller and/or engine 312 may execute a gather operation to service a scatter request (e.g., originating at an application), which may specify a location of data items to be read (e.g., contiguous memory addresses) and may specify the locations to which the read data items are to be written indirectly (by requiring reads of certain locations that enable determining the locations to which the read data items are to be written). The DMA controller and/or engine 312 could likewise execute indirectly specified gather operations.

Figure 3A:
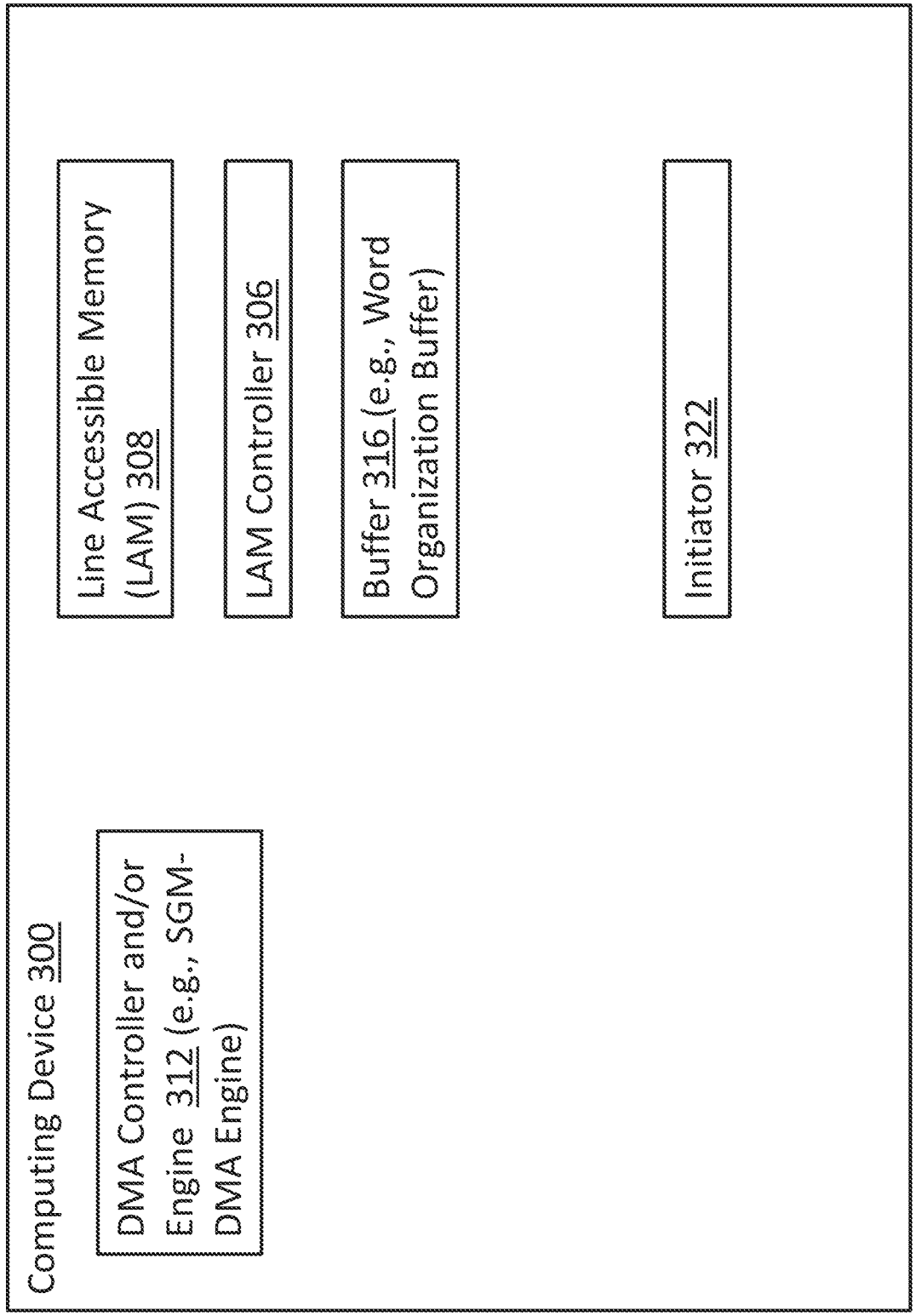
FIGS. 3A and 3E are schematic diagrams of a computing device comprising a DMA controller and/or engine including a buffer to facilitate scatter gather operations, according to an embodiment.

According to an embodiment, use of DMA transactions to assist in the processing of data items in signal streams may be enhanced through the use of scatter and gather operations. In a particular implementation, contents loaded to a buffer from a gather operation may be used to determine one or more addresses for a subsequent gather or scatter operation. FIGS. 3A and 3E are schematic diagrams of a computing device 300 comprising a DMA controller and/or engine 312 that includes or is in communication with a buffer 316 to facilitate scatter and/or gather operations, according to an embodiment. In a particular implementation, computing device 300 may include one or more features of computing device 200 (FIGS. 2A and 2B). DMA controller and/or engine 312 may be configured as a scatter gather multicast DMA engine (SGM-DMA) but with a capability to address words within an addressable line, for example.

According to an embodiment, DMA controller and/or engine 312 may receive input signal streams and/or may feed such input signal streams, either as blocks over virtual channels through a FIFO buffer, to an initial cluster of CNs. In turn, the output signal streams from the initial cluster of CNs may be fed, either as blocks over virtual channels or as data through a FIFO buffer, to a subsequent downstream cluster of CNs. Transfers between clusters of CNs may be multi-cast transfers as dictated by a particular application, for example. At any stage, some or all of the output signal streams from some CN clusters may be returned to DMA controller and/or engine 312 (e.g., in the course of DMA executing scatter or gather operations).

According to an embodiment, a DMA controller and/or engine 312 may perform certain scatter and/or gather operations to transfer data items from one non-contiguous block of memory to another by using a series of smaller contiguous-block transfers. Here, obtaining such data items from a non-contiguous block of a source memory may be executed in a gather operation. Likewise, writing data items to a non-contiguous block of a destination memory may be executed in a scatter operation. In one implementation, a smallest unit of memory that may be accessed in such a source memory or destination memory may be a single addressable line of values and/or states (e.g., single cache line or word in line accessible memory). For example, the DMA controller and/or engine 312 may be in communication with a line accessible memory (LAM) 308, which may be accessible on a line-by-line basis.

According to an embodiment, a physical memory (such as LAM 308) may comprise bit cells to define a value and/or state to express information such as a one or zero. Such a physical memory may further organize bit cells into words that contain an integer number of 8-bit bytes (e.g., four-byte word over 32-bits or eight-byte word over 64-bits). Additionally, such a physical memory may define line addresses (e.g., word line addresses) associated with contiguous bits defining an "addressable line" of values and/or states. For example, responsive to read or write requests (e.g., originating from a host processor) a memory controller may access portions of a memory in read or write transactions targeted according to a word line address specified in a request. To service a read request, for example, a memory controller may retrieve values and/or states for all bytes of a line associated with a line address specified in the read request. Likewise, to service a write request, a memory controller may write values and/or states for all bytes in an addressable line associated with a line address specified in the write request. While a line address may specify a memory location containing all contiguous bytes of an addressable line, such a line address does not specify locations of individual sub portions of such an addressable line, such as an individual byte or contiguous bytes that are less than an entirety of the addressable line or bytes that straddle addressable lines. Such sub portions of an otherwise addressable line are referred to herein as "unaddressable portions."

According to an embodiment, an addressable line may define a smallest unit of memory that may be locatable and/or accessible according to a memory addressing scheme. In the particular example embodiment of FIG. 3C, such an addressable line 360 may be made of smaller units of memory such as bits, bytes or words. In the particular illustrated embodiment, addressable line 360 contains n+1 bytes 3620 through 362*n*. As pointed out above, certain particular implementations may be directed to an update of an unaddressable portion and/or a portion less than an entirety of an addressable line and/or unaddressable portions that straddle multiple lines with or without containing addressable lines. In the illustrated example embodiment, bytes 3622 and 3623 may define an unaddressable portion of addressable line 360. Here, while an entirety of addressable line may be locatable and/or accessible via a unique address according to a memory addressing scheme, bytes 3622 and 3623 (less than an entirety) are not addressable according to the memory addressing scheme.

In an implementation, the LAM 308 may have a LAM controller 306 that is configured to receive a request specifying an address for a line of data items stored in the LAM 308. Such a line of data items may comprise multiple words or multiple bytes, and may be the smallest unit of data items which the LAM 308 is able to retrieve and return to another device. According to an embodiment, the computing device 300 may use buffer 316 to enable access of smaller, unaddressable portions of a line (e.g., single or multiple bytes in a word or group of words). According to an embodiment, circuitry forming buffer 316 may be integrated with circuitry to form DMA controller and/or engine 312 so as to enable minimal latencies for access of buffer 316 initiated by DMA controller and/or engine 312. For example, buffer 316 may be formed as a static random access memory (SRAM) device that is accessible by DMA controller and/or engine 312 without initiating a request and/or transaction on a main memory bus (e.g., bus coupled to LAM 308 or a host computer/processor).

According to an embodiment, the DMA controller and/or engine 312 may be in communication with an initiator 322. The initiator 322 may comprise a device (e.g., implemented at least in part by circuitry and/or logic) that achieves a particular state to trigger one or more DMA transactions to be executed by the DMA controller. For example, initiator 322 may comprise an output register of an ALU, buffer or hardware interrupt handler, just to provide a few examples of a device that may initiate a DMA transaction.

According to an embodiment, DMA controller and/or engine 312 may obtain a list of gather requests responsive to a signal from initiator 322. In one particular implementation, initiator 322 may trigger a DMA transaction responsive to an event or condition in the execution of a particle filter process. For example, a particle filter process may identify data items in memory that are expected to be retrieved for processing in future execution cycles. Once a substantial amount of such data items have been identified, a list of gather requests (e.g., as redirected gather requests) identifying such data items may be forwarded DMA controller and/or engine 312. In an implementation, such a list of gather requests may be provided to DMA controller and/or engine 312 in a shared memory or network-on-chip (NOC), just to provide a couple of examples. Once such a list is known to be available to be processed by DMA controller and/or engine 312, a process for generating the list (e.g., execution of computer-readable instructions) may trigger DMA controller and/or engine 312 via an interrupt or a posted message. Such a trigger may initiate DMA controller and/or engine 312 to initiate one or more gather operation (e.g., redirected gather operations).

Responsive to a signal from initiator 322, DMA controller and/or engine 312 may obtain a list of gather requests in the form of a linked list. Such a linked list may be locatable in a memory (e.g., the reorganization buffer 316 or line accessible memory (LAM) 318) according to an address provided by initiator 322, for example. According to an embodiment, such a list of gather requests may include individual gather requests that are serviceable as stand-alone gather requests independently of other gather requests in the list of gather requests. DMA controller and/or engine 312 may combine addresses in such gather requests with a (potentially smaller) list of line read requests to be executed by a memory controller (e.g., memory controller 106 of FIG. 1). Individual line read requests in such a list of line read requests may indicate a physical memory address (e.g., in LAM 308) specifying a memory location that the memory controller is to read for servicing an individual line read request. Such a memory controller may service such line read requests by loading requested lines to buffer 316. As requested lines read by the memory controller arrive at buffer 316, DMA controller and/or engine 312 may reference an original list of gather requests (used to form the list of line read requests) to extract requested data items from the read lines arriving at buffer 316. DMA controller and/or engine 312 may form packets from the extracted items to be forwarded to one or more requesting entities (e.g., processes executing on a host CPU 202 and/or CN of CN pool 220). In one aspect, data items extracted from lines stored in buffer 316 may comprise two or more unaddressable portions of lines (e.g., selected bytes and/or fields within an addressable line/word such as an addressable line in memory containing data items).

Figure 3B:
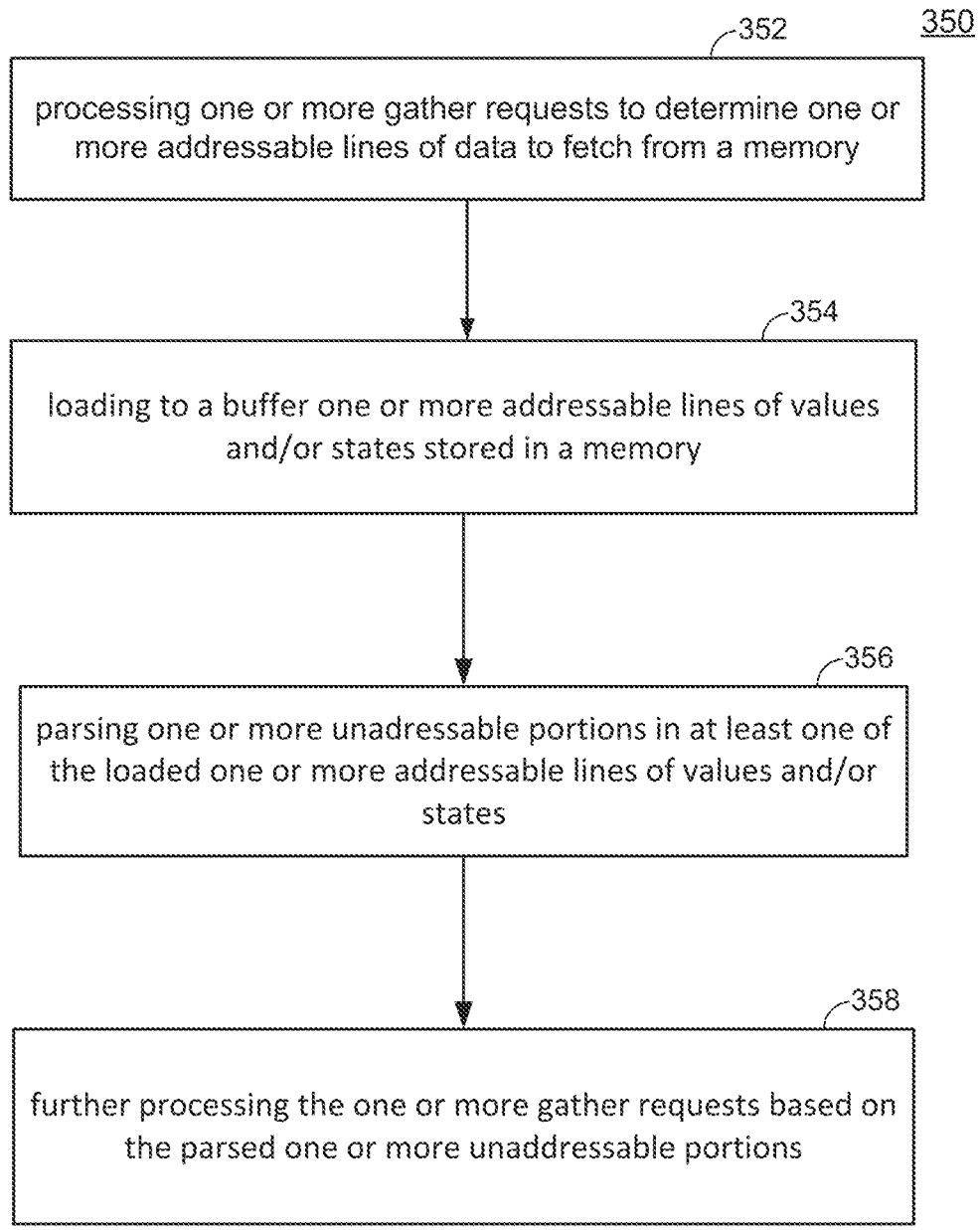
Figure 3C:
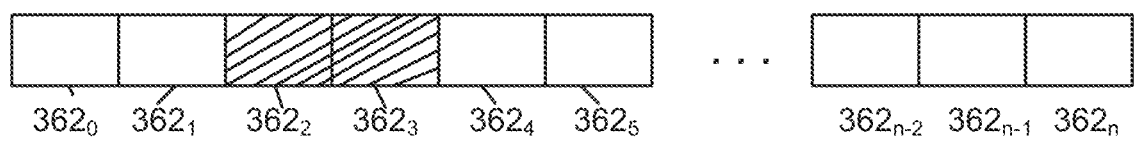
FIG. 3C is a schematic diagram showing unaddressable portions of an addressable line, according to an embodiment.
Figure 3E:
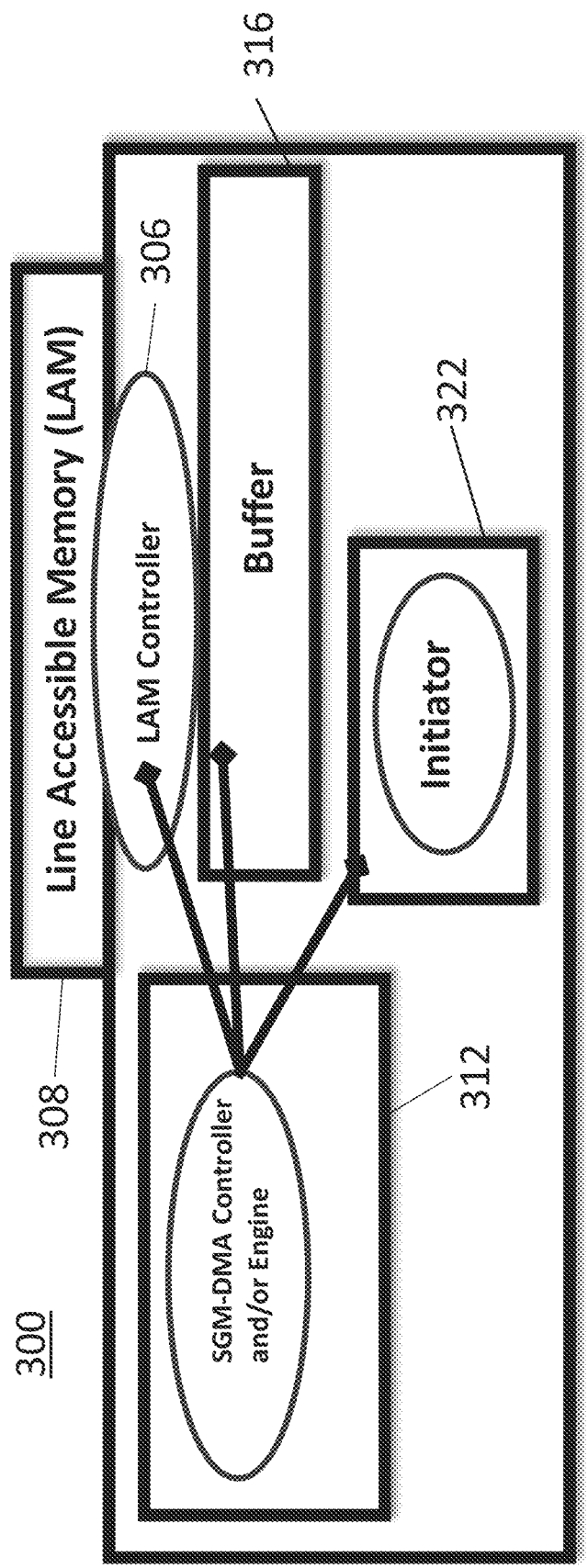

FIG. 3B illustrates a flow diagram of a process 350 for a gather operation, according to an aspect of the present disclosure. In an embodiment, the process 350 may include operations 352, 354, 356 and 358, which may be performed by one or more circuits, such as the DMA controller and/or engine 312 and/or buffer 316. Operation 352 may comprise processing one or more gather requests to determine one or more addressable lines of data items to fetch from memory. For example, operation 352 may map parameters in received requests to addresses in LAM 308. Operation 354 may be implemented by circuitry to load values and/or states to a memory, and may comprise loading, to buffer 316, signals and/or states (e.g., expressing data items) of one or more addressable lines stored in a memory such as LAM 308. As illustrated in FIG. 3B, operation 356 may comprise parsing one or more unaddressable portions of lines loaded to buffer 316 at operation 354 into portions such as single or multiple bytes in a word or group of words, for example. Operation 358 may comprise completing processing of two or more gather requests by, for example, returning unaddressable portions parsed at operation 356.

As illustrated in FIG. 3B, operation 358 may comprise responding to multiple gather requests that are presented to DMA controller and/or engine 312 in a list of gather requests. The loading of one or more addressable lines to buffer 316 at operation 354 may occur responsive to the list of gather requests. Operation 354 may parse two or more unaddressable portions according to data items specified in the list of gather requests. For example, operation 356 may decode parameters in the gather requests to be mapped to byte offsets from a line address to corresponding the unaddressable portions. Parsed portions may then be forwarded to an initiator of the gather requests (e.g., initiator 322). Here, process 350 may enable servicing multiple gather requests with access of a single addressable line loaded to buffer 316 if the multiple gather requests specify parsed portions within the same single addressable line, for example. This may obviate a need for DMA controller and/or engine 312 to access the same addressable line multiple times for separate gather requests for data items in the same addressable line (e.g., in LAM 308).

To service one or more gather requests, process 350 may gather less than an entirety of an addressable line in memory by loading the addressable line to a buffer, and parsing unaddressable portions to be provided to a requester. While some gather requests may call for a gather of less than an entirety of an addressable line, one or more received gather requests may call for a gather of an entirety of an addressable line and/or of multiple lines and/or of bytes that straddle lines. For gather requests calling for a gather of less than an entirety of an addressable line, DMA controller and/or engine 312 may execute process 350. According to an embodiment, for gather requests calling for a gather of an entirety of an addressable line, DMA controller and/or engine 312 may bypass operations 354, 356 and 358, and execute a gather operation without loading addressable lines to buffer 316.

In another implementation, DMA controller and/or engine 312 may obtain a list of scatter requests responsive to a signal from initiator 322. The DMA controller and/or engine 312 may obtain such a list of scatter requests in the form of a linked list locatable in a memory according to an address provided by initiator 322. DMA controller and/or engine 312 may then combine addresses to be accessed by such scatter requests with a (potentially smaller) list of line read requests to be executed by a memory controller (e.g., memory controller 106). For example, scatter requests in the list of scatter requests referencing data items in the same addressable line of memory may be combined such that only a single line read requested is needed (to access data items to service multiple scatter requests). Requested lines read by such a memory controller may be loaded to buffer 316.

According to an embodiment, the obtained list of scatter requests may indicate specific unaddressable portions (e.g., individual bytes or fields) of addressable lines to be read and loaded to buffer 316. The unaddressable portions in the addressable lines loaded to buffer 316 may then be modified and/or overwritten. As requested lines read by the memory controller arrive at buffer 316, DMA controller and/or engine 312 may reference an original list of scatter requests to determine specific unaddressable portions of read lines arriving at buffer 316 which are to be modified and/or overwritten. DMA controller and/or engine 312 may form packets from modified lines in buffer 316 to written back to memory via the memory controller.

FIG. 3D illustrates a flow diagram of a process 370 for a scatter operation, according to an embodiment. The process 370 may include operations 372, 374, 376 and 378. Operation 372 may comprise receiving one or more scatter requests from initiator 322, for example. Operation 374 may comprise loading, to buffer 316, signals and/or states (e.g., expressing data items) of one or more addressable lines in a memory such as LAM 308. In a particular implementation, DMA controller and/or engine 312 may determine the addressable lines to be fetched from LAM 308 at operation 374 by processing one or more gather requests. Operation 376 may comprise writing values and/or states to at least one unaddressable portion of lines loaded to buffer 316 at operation 374 to at least partially modify the one or more addressable lines stored in buffer 316. For example, operation 374 may write values and/or states to two or more unaddressable portions based on multiple scatter requests received at block 372. Operation 378 may complete service of such scatter requests by initiating write operations to write the at least one of the one or more addressable lines modified at operation 374 back to memory (e.g., LAM 308). For example, operation 378 may initiate operations to write back to line addresses in LAM 308 addressable lines loaded at operation 374 and modified at operation 376.

In a particular implementation, operation 374 may be initiated by scatter requests received at operation 372. Here, the one or more addressable lines of values and/or states loaded to buffer 316 at operation 374 may be obtained by service of one or more line read requests by a memory controller (e.g., memory controller 106). Operation 378 may, for writing modified addressable lines, comprise initiating the memory controller to execute one or more operations to write one or more modified addressable lines. Here, process 370 may enable servicing multiple scatter requests with access of a single addressable line loaded to buffer 316. Multiple scatter requests received at operation 372 may specify words, bytes, fields, etc., within the same single addressable line, for example. This may obviate a need for DMA controller and/or engine 312 to access the same addressable line multiple times for separate scatter requests for data items in the same addressable line (e.g., in LAM 308). Process 370 may further comprise transformation of multiple scatter requests received at operation 372 to a list of line read requests to be issued to a memory controller (the list of line read requests to specify the one or more addressable lines of values and/or states). Such a transformation of the multiple scatter requests to the list of line read requests may further comprise construction of at least one single line read request for an addressable line in memory containing data items requested by at least two scatter requests received at operation 372.

To service one or more scatter requests, process 370 may update less than an entirety of an addressable line in memory by loading the addressable line to buffer 316, and updating some portions of the loaded addressable lines while maintaining other portions unchanged. While some scatter requests may call for an update of less than an entirety of an addressable line, one or more received scatter requests may call for an update to an entirety of an addressable line for which the DMA would just write rather than execute a read-modify-write operation. For scatter requests calling for an update to less than an entirety of an addressable line, DMA controller and/or engine 312 may execute process 370. DMA controller and/or engine 312 may also be configured to service scatter requests calling for an update of an entirety of an addressable line by bypassing loading of the addressable line to buffer 316. Here, to complete such an update to an entirety of an addressable line, DMA controller and/or engine 312 may initiate a write operation to the addressable line in LAM 308 without loading the addressable line to buffer 316.

According to an embodiment, DMA controller and/or engine 312 may receive multiple scatter requests collectively calling for update to the same overlapping portion of an addressable line in LAM 308. This may give rise to a conflict as to how the overlapping portion is to updated for serving the multiple scatter requests. Such multiple scatter requests may be ordered according to a time of creation or time of receipt, for example. According to an embodiment, conflicts for updating a portion of an addressable line by multiple scatter requests may be resolved according to a latest scatter request created or received, for example.

In particular implementations of processes 350 and 370, an unaddressable portion of a line stored in buffer 316 may be bytes, a collection of bytes or fields, etc. While particular actions in the above scatter and gather operations are described as occurring in a particular sequence, certain actions may be executed concurrently, and that certain actions may be executed concurrently or in a particular sequence as a matter of engineering choice. Additionally, physical optimizations, such as a number and type of processing cores to be used for realizing features of DMA controller and/or engine 312 and interface engines, a number and type of memory blocks for associated memory elements and buffer 316, a number of ports and addressability features of memories forming LAM 308, may be selected as a matter of engineering choice. For example, buffer 316 may or may not be byte addressable, and the DMA controller and/or engine 312 may comprise a scalar or a vector engine, for example.

Figure 4A:
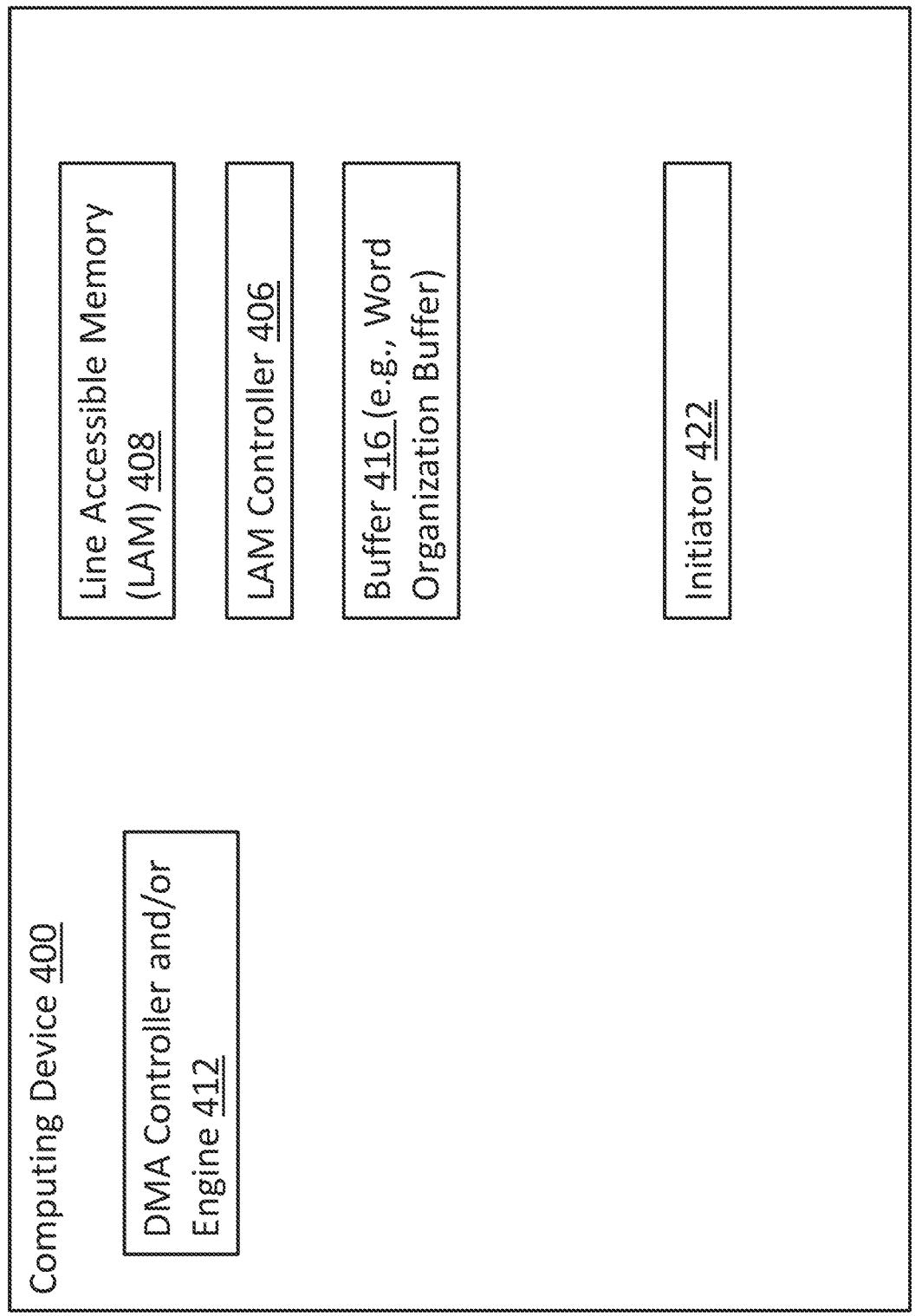
FIGS. 4A and 4D are schematic diagrams of a computing device comprising a DMA controller including a buffer to facilitate a redirection of DMA transactions, according to an embodiment.
Figure 4B:
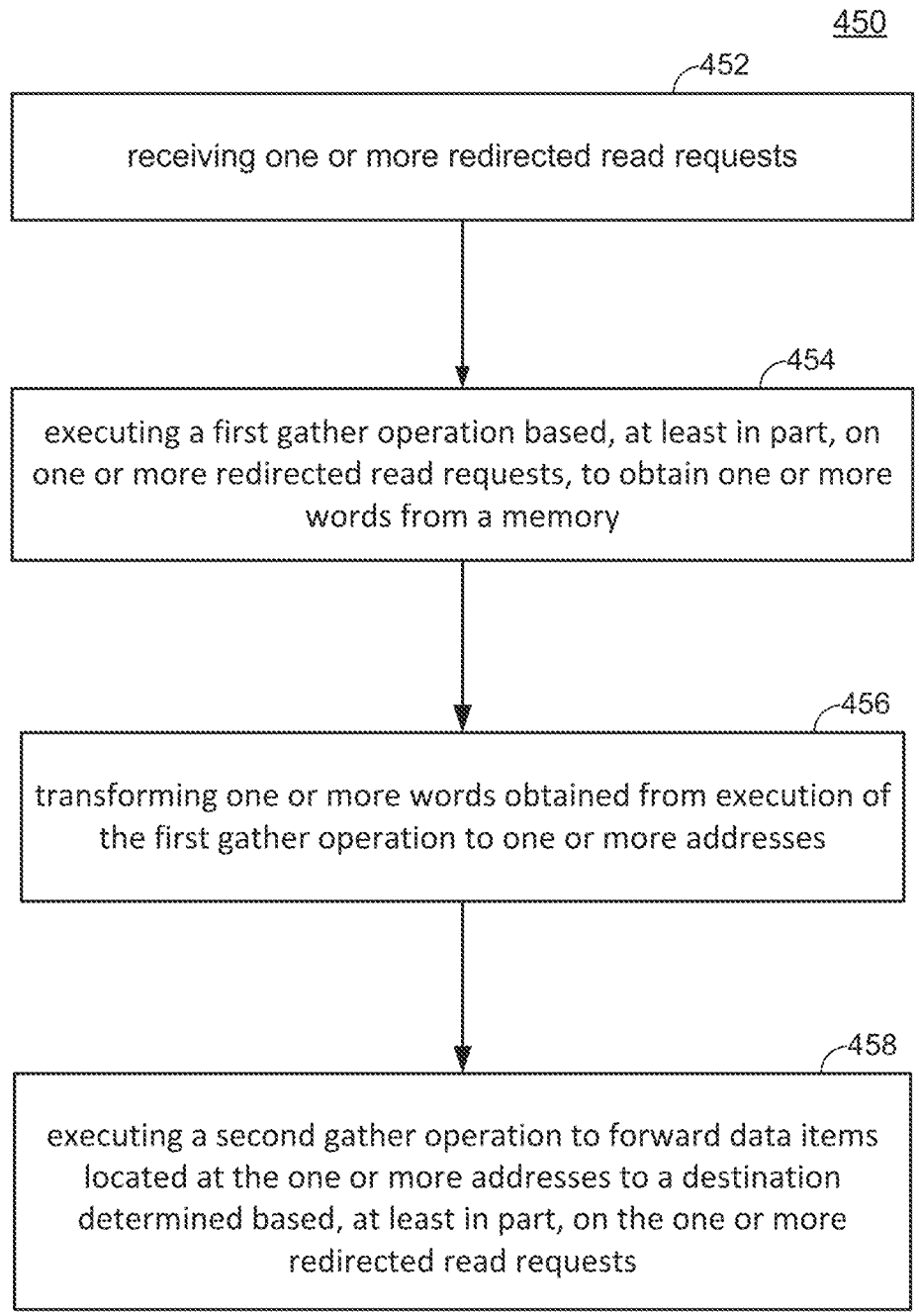
FIGS. 4B and 4C are flow diagrams of processes to facilitate a redirection of DMA transactions, according to an embodiment.
Figure 4C:
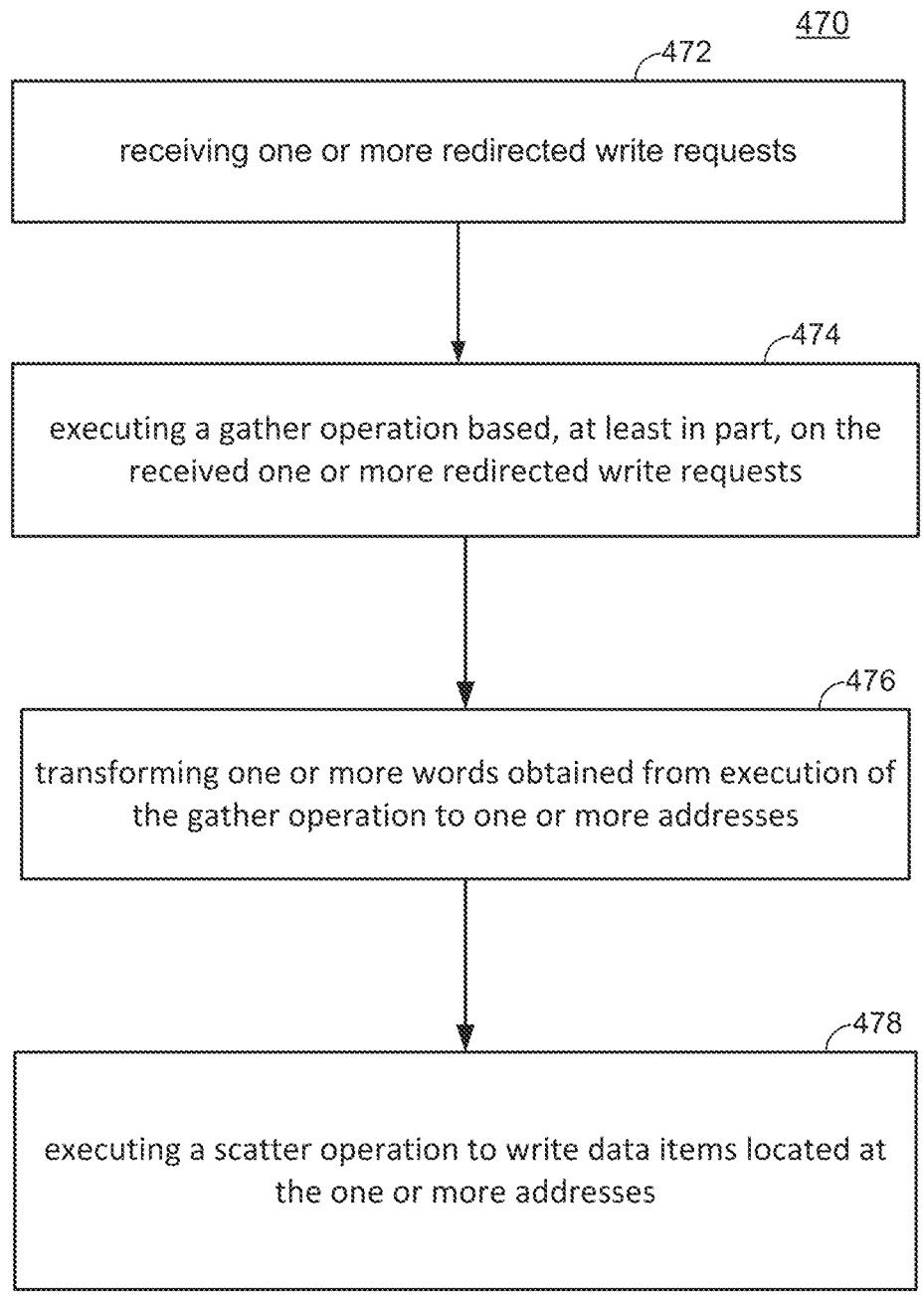
Figure 4D:
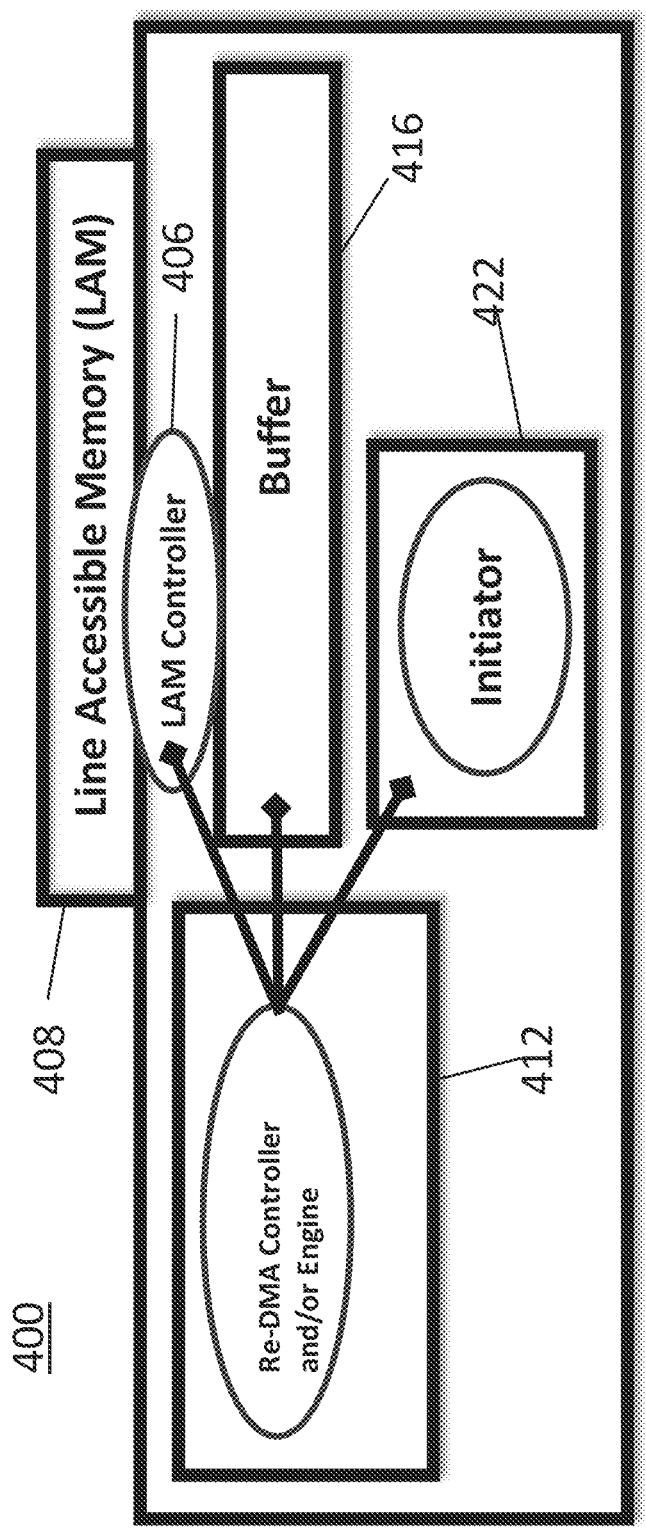

FIGS. 4A and 4D are schematic diagrams of a computing device 400 comprising a DMA controller and/or engine 412 that is in communication with a buffer 416 and an initiator 422 to facilitate a redirection of DMA transactions, according to an embodiment. In a particular implementation, computing device 400 may include one or more features of computing device 200 (FIGS. 2A and 2B). According to an embodiment, DMA controller and/or engine 412 may obtain a list of redirected read requests responsive to a signal from the initiator 422. According to an embodiment, a read request may comprise a message and/or signal that specifies one or more target memory addresses that are to be accessed in a read transaction to service the read request. For example, a read request may specify one or more target addresses as word line addresses of locations in a memory containing contents that are to be retrieved in a memory read transaction to service the read request. A "redirected read request," as referred to herein, means a read request that has been transformed or altered such that the content(s) at an original target memory address(es) is modified and/or transformed to a different memory address(es). Here, the different memory address(es) specify locations in a memory containing contents that are to be retrieved in a read transaction to service the redirected read request. DMA controller and/or engine 412 would interpret addresses specified in such redirected read requests as a word gather request to store gathered words in buffer 416, for example. A size of an associated word to be read first for servicing a word gather request part of a redirected read request may depend, at least in part, on how the associated word is to be interpreted to form a target address for a redirection, for example. In one implementation, a word to be read may comprise an address or an index of an array that may be converted to an address, for example. In an implementation, DMA controller and/or engine 412 may then transform gathered words stored in buffer 416 to addresses, and merge the addresses (i.e., the transformed gathered words) with the redirected read requests to form a gather request. DMA controller and/or engine 412 may then service the formed gather request to transmit resulting data items to a destination as set forth in redirected read requests obtained responsive to a signal from initiator 422.

FIG. 4B is a flow diagram of a process 450 to facilitate a redirection of DMA transactions, according to an embodiment. The process 450 may include operations 452, 454, 456 and 458. Operation 454 may comprise executing a gather operation (e.g., a word gather operation) based, at least in part, on one or more redirected read requests received at operation 452. In this operation, DMA controller and/or engine 412 may obtain or otherwise receive such redirected read requests responsive to a signal from the initiator 422, for example. In a particular implementation, DMA controller and/or engine 412 may interpret the one or more redirected read requests as a request for a first of two gather operations to be executed. In the course of a first gather operation executed at operation 454, "gathered" data items may be loaded to the buffer 416.

Operation 456 may comprise transforming one or more gathered data items stored in buffer 416 to one or more addresses, to specify a subsequent gather operation. For example, operation 456 may comprise transforming one or more words obtained from execution of a first word gather operation (executed at operation 454) to one or more addresses (also referred to as one or more address values). In one particular implementation, operation 456 may comprise parsing values and/or states in buffer 416 (from gather operation) to determine one or more memory addresses in LAM 408. Operation 456 may further comprise applying one or more arithmetic operations to the parsed values and/or states to determine the one or more memory addresses in LAM 408. For example, operation 456 may apply one or more arithmetic operations to parsed values and/or states to be stored in the buffer, which are to form a memory address to a memory location in LAM 408. Such a formed address to a memory location in LAM 408 may form the basis for a subsequent gather operation.

According to an embodiment, an arithmetic operation applied at operation 456 may be defined according to expression (1) as follows:

$$address = base + x \times element\_size, \qquad (1)$$

where:
  address is a target the address (e.g., for a gather operation determined at operation 456 or for a scatter operation at operation 476);
  x is a value obtained from a gather operation (e.g., at operation 454 or 474); and
  base and element_size are parameters provided in a redirected request (e.g., redirected read request received at operation 452 or a redirected write request received at operation 472).

Operation 458 may comprise executing the second (e.g., subsequent) gather operation to forward data items located at the one or more determined addresses to a destination. Such a destination may be determined based, at least in part, on the one or more redirected read requests. In another implementation, operation 458 may execute two or more gather operations based on one or more addresses obtained at operation 456. According to an embodiment, in executing a gather operation, operation 458 may interpret one or more redirected read requests as two requests for a word gather operation.

According to an embodiment, a write request may comprise a message and/or signal that specifies one or more target memory addresses that are to be accessed in a memory write transaction to service the write request. For example, a write request may specify one or more target addresses as word line addresses of locations in a memory that are to be written to in a memory write transaction (to service the write request). A "redirected write request," as referred to herein, means a write request that has been transformed or altered such that an original target memory address(es) is modified and/or transformed to a different target memory address(es). Here, the different target memory address(es) specifies locations in a memory that are to be written to in a write transaction to service the redirected write request.

In another particular implementation, the DMA controller and/or engine 412 may obtain a list of redirected write requests responsive to a signal from initiator 422. DMA controller and/or engine 412 may interpret addresses specified in such redirected write requests as a gather request. Such a gather request may be to load gathered words in buffer 416, for example. The associated word to be read may have a size that depends, at least in part, on how the associated word is to be interpreted to form a target address for a redirection, for example. One or more such words loaded to buffer 416 may be interpreted to form a target address for redirection. In one implementation, such a word loaded to buffer 416 may comprise an address or an index of an array that may be converted to an address, for example. In an implementation, DMA controller and/or engine 412 may then transform gathered words stored in buffer 416 to addresses, and merge the addresses with the redirected write requests to form a scatter request. DMA controller and/or engine 412 may then service the formed scatter request resulting in update of lines as per redirected write requests obtained responsive to a signal from initiator 422.

FIG. 4C is a flow diagram of a process 470 to facilitate a redirection of DMA transactions, according to an embodiment. Operation 472 may comprise executing a word gather operation based, at least in part, on one or more redirected write requests received at operation 472. DMA controller and/or engine 412 may receive such redirected write requests at operation 472 responsive to a signal from initiator 422, for example. In a particular implementation, DMA controller and/or engine 412 may interpret the one or more redirected write requests as a request for a word gather operation to be executed followed by execution of a word scatter operation. In the course of a word gather operation executed at operation 474, "gathered" data items may be loaded to buffer 416. Operation 476 may comprise transforming one or more gathered data items stored in buffer 416 (from gather operation) to one or more addresses to specify a subsequent word scatter operation. In one particular implementation, operation 476 may comprise parsing values and/or states in buffer 416 to determine one or more memory addresses in LAM 408. For example, operation 476 may be executed, at least in part, by circuitry to parse values and/or states (e.g., a DMA controller and/or engine adapted to parse values and/or states) in a buffer to determine at least one of the one or more addresses. For example, operation 476 may apply one or more arithmetic operations to parsed values and/or states to be stored in the buffer, which are to form a memory address in LAM 408. Operation 476 may further comprise applying one or more arithmetic operations to the parsed values and/or states to determine the one or more memory addresses to memory locations in LAM 408.

Operation 478 may comprise executing a scatter to write particular data items to the one or more addresses obtained at operation 476 based, at least in part, on the one or more redirected read requests. According to an embodiment, operation 476 may apply a arithmetic operation to compute a target address for a scatter operation to be executed at operation 478 according to expression (1). For example, DMA controller and/or engine 412 may form such a scatter request based, at least in part, on the contents at one or more addresses determined at operation 476. Such particular data items to be written from such a scatter request may be specified, for example, in the one or more redirected write requests received at operation 472 responsive to the signal from initiator 422. In one particular implementation, operation 478 may comprise interpreting the contents at addresses determined at operation 476 as addresses for a scatter operation.

Figure 5A:
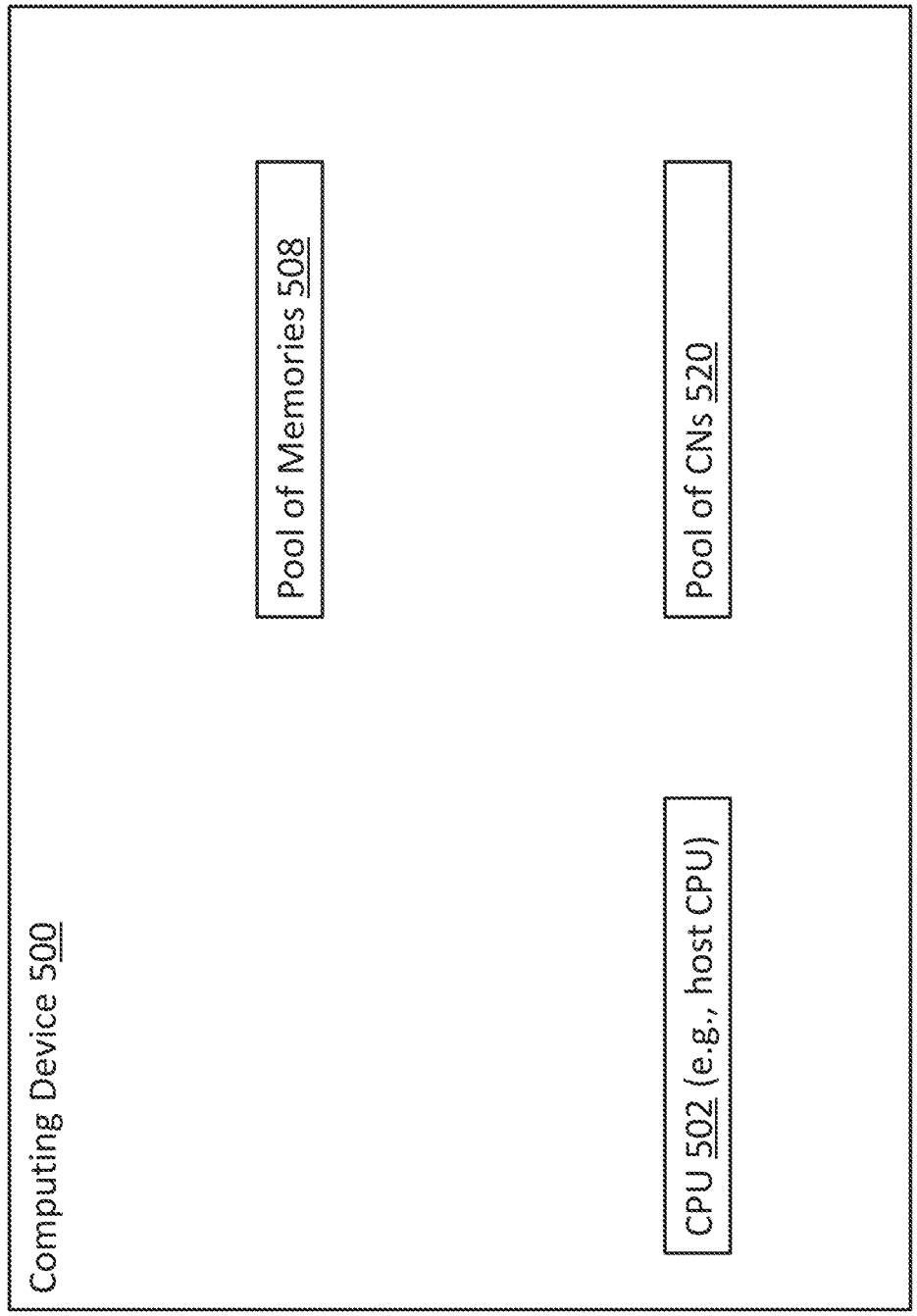
FIGS. 5A and 5C are schematic diagrams of a computing device to facilitate a processing of multiple signal streams from an associated multiple sources, according to an embodiment.
Figure 5C:
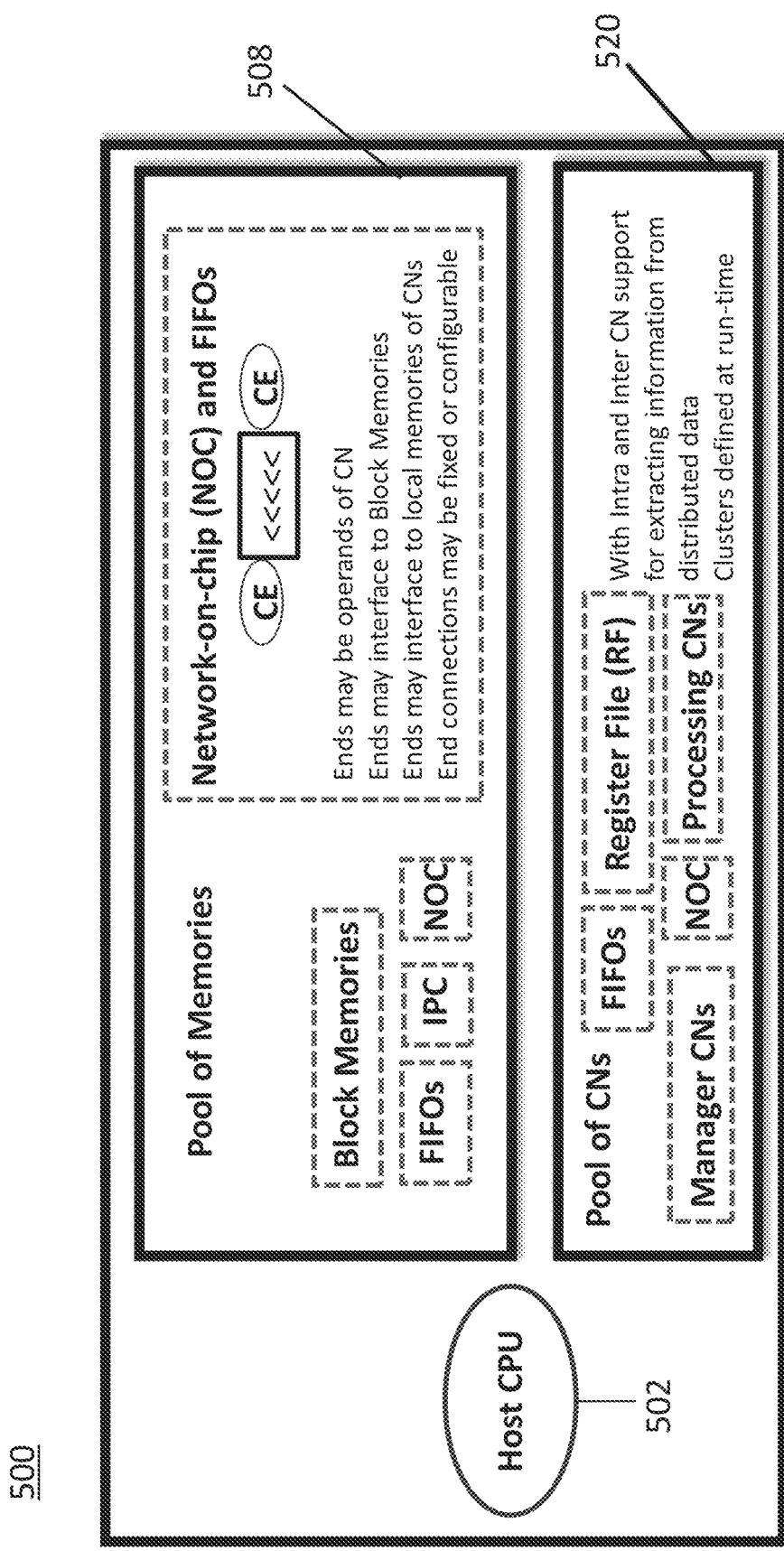

One particular implementation of a computing device for processing of multiple signal streams from an associated multiple associated sources is shown by computing device 500 in FIGS. 5A and 5C. In a particular implementation, computing device 500 may include one or more features of computing device 200 (FIGS. 2A and 2B). Computing device 500 may comprise a pool of compute nodes (CNs) 520 with associated register files and local memories, a pool of block memories and FIFO buffers and an NOC interconnecting various components. As pointed out above, CNs in pool of CNs 520 may comprise scalar CNs and/or processing circuit cores to implement ALUs, digital signal processors (DSPs), vector CNs, VLIW engines or field programmable gate array (FPGA) cells, or a combination thereof, just to provide a few examples of particular circuit cores that may be used to implement CNs in pool of CNs 520. In one implementation, a CN may comprise a single processing circuit core capable of executing operations to map input operands to output computing results. In another implementation, a CN may comprise multiple distinct processing cores to execute operations to map input operands to output computing results. A CN in pool of CNs 520 may comprise a dedicated local memory (e.g., SRAM) and general registers to receive operands for operations to be executed and/or to provide results from execution of operations. In one particular implementation, a CN in a pool of CNs 520 may be formed from one or more processing circuit cores integrated/configured with elements of pool of memories 508 (e.g., transport memory 218) such as FIFO buffers. In an embodiment, pool of memories 508 may provide memory resources to be shared among CNs in pool of CNs 520, and may facilitate communication between and/or among CNs in pool of CNs 520. For example, end points of FIFO buffers integrated/configured with pool of CNs 520 may comprise memory blocks that are local to or isolated from CNs and/or register files of CNs of CNs 520. Functionalities of CNs in pool of CNs 520 may be that of a host processor, processing manager or signal processor, or a combination thereof, just to provide a few examples. According to an embodiment, CNs in pool of CNs 520 may support atomics, interrupts and other inter processor communication (IPC) features to facilitate signal communication between and/or among CNs in pool of CNs 520.

According to an embodiment, computing device 500 may receive signal streams containing data items (e.g., sensor signals, observations and/or measurements, time stamps, metadata, etc.) fed from external sources such as sensors and/or memories. External memories (not shown) may be coupled with DMA controllers and/or engines (e.g., DMA controllers and/or engines 312 and/or 412). CNs in pool of CNs 520 may also provide sources of signal streams containing data items. For example, a CN in pool of CNs 520 may feed data items in a signal stream to be loaded into a FIFO buffer. A CN in pool of CNs 520 may also feed data items in a signal stream by transporting a packet of output parameters within an IC device in an NOC as a block of data items. According to an embodiment, a single logical signal stream may be transmitted in multi-cast fashion to multiple CNs in pool of CNs 520. Also, a single logical signal stream may be segmented into sub-signal streams to be fed to a sub-set of CNs in pool of CNs 520. In another embodiment, some CNs in pool of CNs 520 may process data items from various signal streams to provide output signal streams as input streams to other CNs in pool of CNs 520. A final output of CNs in pool of CNs 520 may comprise signal streams output from computing device 500 into sinks such as actuators, memories, storages or display devices, just to provide a few examples. Processing between and/or among CNs in pool of CNs 520 may be controlled and/or orchestrated via a combination of interrupts, polling of status flags, and periodic inspection for work, just to provide a few examples.

FIG. 5B is a flow diagram of a method 500 (also referred to as a process 500) to process multiple signal streams from an associated multiple sources, according to an embodiment. According to an embodiment, process 500 may combine data items received in signals streams from multiple sources to update a state of a particle filter (e.g., to support automated operation of a motor vehicle). Such multiple sources may comprise, for example, multiple sensor devices (e.g., deployed in a motor vehicle) such as, for example, cameras, speedometers, active sensing devices (e.g., radar/lidar), environment sensors (e.g., thermometer, light sensor, altimeter, etc.) microphones, just to provide a few examples. Such signal streams from multiple sources may be received in signal packets from a communication network (e.g., signal packets including sensor measurements and/or observations obtained from a remote vehicle). In a particular implementation, data items received in signal streams from the multiple sources may comprise sensor measurements and/or observations having common attributes that are identifiable by process 500. In a particular implementation, such common attributes may be identifiable by metadata co-located with measurements and/or observations received from the multiple sources. For example, such common attributes may be related by time (e.g., time stamp indicating a time of measurement and/or observation), space (e.g., location referenced to an origin such as a point on a motor vehicle) and source (e.g., which particular physical sensor on the motor vehicle or which particular type of sensor among the sensors mounted on the motor vehicle).

Operation 552 may comprise associating data items received from a plurality data streams based, at least in part, on attributes common to the data items. Such a plurality of data streams may be provided as outputs of CNs and/or DMA gather or word gather or redirected read/gather operations. For example, operation 552 may sort and/or correlate (e.g., "bucketize") measurements and/or observations received from different signal streams by time (e.g., according to time stamps) and/or space (e.g., location of an observed object relative to a reference point). In a particular implementation, operation 552 may associate measurements and/or observations obtained at roughly the same time and received from different sources (e.g., different sensors) with a location of a particle defined in a current state of a particle filter. In one particular embodiment, operation 552 may associate measurements and/or observations from different sources according to a locality of a particular object observed and/or measured by such associated measurements and/or observations. In another particular implementation, a data item from each of the plurality of signal streams may be loaded to a buffer (e.g., buffer 216) associated with a direct memory access DMA controller associated with the signal stream. Operation 552 may then identify at least one of the common attributes associated with the data item loaded to the buffer based, at least in part, on contents of the data item loaded to the buffer.

Operation 554 may comprise contemporaneously loading data items associated at operation 552 to one or more registers of a compute node (e.g., general registers of an ALU or other processing core forming the compute node) without storing the data items in a line accessible memory. According to an embodiment, registers of a compute node may be loaded with data items to be retrieved on execution cycles of the compute node. For example, data items loaded to registers of a compute node in one execution cycle (e.g., at an endpoint of a FIFO buffer) may provide operands for a computing operation to be executed by the compute node in the next execution cycle. In one particular implementation, the one or more registers of the compute node may comprise endpoints of associated FIFO buffers formed by internal memory (e.g., pool of memories 508). Multiple such FIFO buffers having endpoints at registers of a compute node may be synchronized to apply data items from multiple sources (e.g., loaded data items from different sensors) as operands of the compute node that have common attributes (e.g., time and space attributes). Operation 556 may comprise execution of the compute node to process data items contemporaneously loaded at operation 554 to process the loaded data items as operands to one or more computing operations (e.g., to perform one or more functions such as, for example, update a state of a particle filter). Data items outputted from execution of the one or more computing operations at operation 556 may form data items for an additional signal stream to be processed by an additional compute node and/or for storage in a memory.

In one embodiment, operation 552 may be performed by a first compute node that is to sort sensor observations and/or measurements received in multiple signal streams based, at least in part, on associated timestamps and localities of objects observed and/or measured by the sensor observations and/or measurements. Sorted sensor observations and/or measurements may then be loaded to one or more registers of a second compute node at block 554. Execution of the second node at block 556 may then combine the sorted sensor observations and/or measurements.

In another embodiment, data items of an additional signal stream as an output of operation 556 may be loaded to one or more registers of a subsequent compute node as operands for one or more additional computing operations. For example, one or more direct memory access transactions may be executed to store data items of the additional signal stream to an external memory, execute a word scatter operation to write the data items of the additional signal stream, execute a redirected write operation to write the data items of the additional signal stream or provide the data items of the additional signal stream as control signals to one or more actuators, or a combination thereof.

In this context, "contemporaneously loading" as referred to herein is to mean a loading of data items to be processed by a computing node in the same execution cycle. If data items from synchronized signal streams are to be contemporaneously loaded to registers of a compute node, such data items may be loaded to the registers in the same execution cycle of the compute node (e.g., to be operands of a computing operation executed in the next execution cycle). If data items from respective unsynchronized signal streams are to be contemporaneously loaded to registers of a compute node, such data items may be loaded to the registers in different (e.g., adjacent) execution cycles of the compute node. For example, execution of the compute node may be suspended for one or more execution cycles to allow for the multiple data items from different unsynchronized signal streams to be loaded to the registers as operands of a computing operation in an execution cycle of the compute node. In another embodiment, transparent block and release mechanisms may be applied to a compute node to facilitate a contemporaneous loading of data items to registers of the compute node from unsynchronized signal streams.

According to an embodiment, data items in at least two signal streams associated at operation 552 may comprise sensor observations and/or measurements that are associated at operation 554. Data items contemporaneously loaded at operation 554 may then comprise the associated sensor observations from multiple signal streams (e.g., from multiple different sources). In a particular implementation, operation 552 may comprise combining the sensor observations and/or measurements in the at least two signal streams to provide combined sensor observations and/or measurements. Operation 552 may then sort and/or correlate (e.g., bucketize) the combined sensor observations and/or measurements based, at least in part on associated timestamps and localities of objects observed and/or measured by the sensor observations and/or measurements.

In a particular implementation, operation 554 may be implemented, at least in part, using process 350 (FIG. 3B)

and/or process 450 (FIG. 4B). For example, a DMA controller and/or engine may execute gather operations as set forth in process 350 and/or 450 to fill a queue maintained by FIFO buffers (e.g., with associated measurements and/or observations) to load registers of a compute node. Such execution of a DMA controller and/or engine may selectively load data items to one or more registers based, at least in part, on indications of common attributes in content of the data items loaded to the FIFO buffers. In an implementation, multiple FIFO buffers may have endpoints at corresponding registers of a compute node where queues of different FIFO buffers are to be filled with data items from different signal streams (e.g., measurements and/or observations from different sensors). Queues of multiple FIFO buffers may be filled such that data items from different signal streams associated by particular attributes (e.g., temporal and spatial attributes) are contemporaneously loaded to endpoints of the FIFO buffers (e.g., at general registers of a compute node). According to an embodiment, operations 552 and 554 may be performed by a first compute node to contemporaneously load associated data items to one or more registers of a second compute node in one execution cycle of the second compute node. In a subsequent execution cycle of the second compute node, the second compute node may execute a computing operation using as operands associated data items contemporaneously loaded at block 554. In one implementation, contemporaneous loading of data items at block 554 may be facilitated by FIFO buffers having endpoints at registers of the second compute node. Here, the first compute node may fill queues of the FIFO buffers with associated data items from different signal streams such that respective associated data items arrive at endpoints of the FIFO buffers at the same or proximate execution cycle. Such a filling of queues of the FIFO buffers with associated data items may obviate any need for storage of the associated data items by the first compute node in a line accessible memory (e.g., line accessible memory 208 or RAM 108).

In another particular implementation, results of execution of a compute node at operation 556 may provide data items for one or more additional signal streams. In one implementation, such data times for an additional signal stream may be loaded to one or more registers of a subsequent compute node and/or downstream compute node. In one example, data items at output registers of a compute node (e.g., loaded from execution of a computing operation) may be transferred to a line accessible memory by DMA write transactions, word scatter DMA transactions and/or redirection scatter DMA transactions (e.g., according to process 470, FIG. 4C). Such a DMA transaction may store data items of an additional signal stream to the line accessible memory, for example. In another example, such data items provided at output registers of a compute node may be applied as data items of input signal streams to one or more other compute nodes. In one particular implementation, results from execution of a first compute node at operation 556 may load results to output registers defined as first endpoints of associated FIFO buffers (e.g., from pool of memories 508). The associated FIFO buffers may then have second endpoints defined to be input registers of a second compute node to receive as operands results determined by execution of the first compute node.

According to an embodiment, operations 552 and 554 may be executed by a first CN of pool of CNs 520 while operation 556 may be executed by a second CN of pool of CNs 520. At operation 554, the first compute node may contemporaneously load associated data items (e.g., data items containing sensor observations and/or measurements associated based, at least in part, on spatial and temporal attributes and the contemporaneously loaded data items comprise the associated sensor observations and/or measurements) to one or more registers of a second CN of pool of CNs 520. The second CN may then process data items contemporaneously loaded by the first CN as operands to one or more computing operations at operation 556. In one implementation, a first FIFO buffer may define a first endpoint as register of the first CN (e.g., an output register of the first CN). A second endpoint of the first FIFO buffer may define a first register of the one or more registers of the second CN (e.g., an input register of the second CN). As may be observed, the first FIFO may enable data items to be contemporaneously loaded to the one or more registers of the second CN at operation 554 without storing the associated data items in an line accessible memory as pointed out above. In another implementation, a FIFO buffer may define a first endpoint as register of a third CN of pool of CNs 520 and a second endpoint as at least a second register of the one or more registers of the second CN. Here, both the first CN and the third CN may contemporaneously load associated data items to the one or more registers of the second CN node at operation 554 and without storing the associated data items in an line accessible memory.

According to an embodiment, all or a portion of computing device 200, 300 (e.g., including features implementing processes 350 and/or 370 such as circuitry to form a DMA controller), 400 (e.g., including features implementing processes 450 and/or 470 such as circuitry to form a DMA controller) and/or 500 (e.g., including features implementing process 550), may be formed by and/or expressed, in whole or in part, in transistors and/or lower metal interconnects (not shown) in processes (e.g., front end-of-line and/or back-end-of-line processes) such as processes to form complementary metal oxide semiconductor (CMOS) circuitry, just as an example. It should be understood, however that this is merely an example of how circuitry may be formed in a device in a front end-of-line process, and claimed subject matter is not limited in this respect.

It should be noted that the various circuits disclosed herein may be described using computer aided design tools and expressed (or represented), as data and/or computer-readable instructions embodied in various computer-readable media (e.g., a non-transitory storage medium), in terms of their behavioral, register transfer, logic component, transistor, layout geometries, and/or other characteristics. Formats of files and other objects in which such circuit expressions may be implemented (e.g., in circuit device) to include, but not be limited to, formats supporting behavioral languages such as C, Verilog, and very high speed integrated circuit hardware description language (VHDL), formats supporting register level description languages like register transfer language (RTL), formats supporting geometry description languages such as graphic design system II (GDSII), graphic design system III (GDSIII), graphic design system IV (GDSIV), Caltech Intermediate Form (CIF), manufacturing electron beam exposure system (MEBES) and any other suitable formats and languages. Storage media in which such formatted data and/or instructions may be embodied to include, but not be limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves may include, but not be limited to, transfers (uploads, downloads, e-mail, etc.) over the Internet and/or other computer networks via one or more electronic communication protocols (e.g., hypertext transfer protocol (HTTP), file transfer protocol (FTP), simple mail transfer protocol (SMTP), etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process (e.g., wafer fabrication process).

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Figure 6:
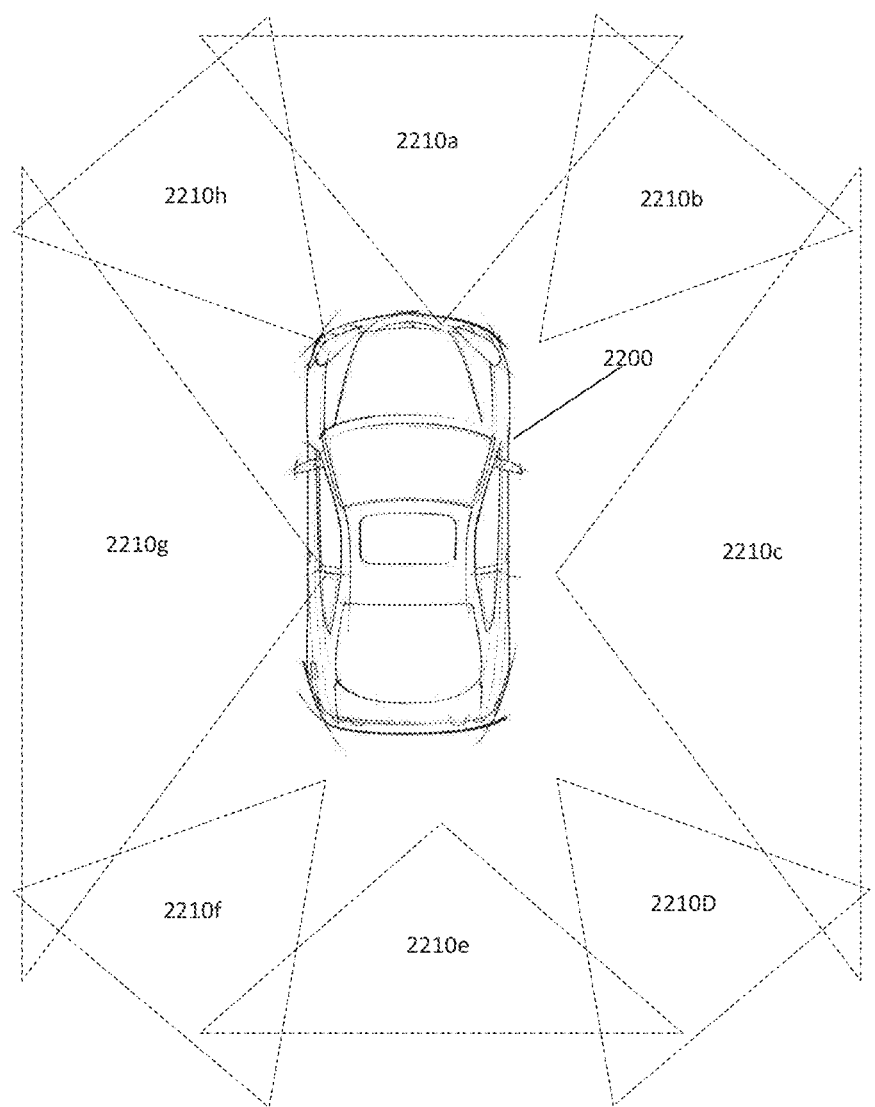
FIG. 6 is an illustration depicting example sensor signal gathering for an example vehicle, in accordance with an embodiment.

FIG. 6 is an illustration depicting an example sensor signal gathering pattern for an embodiment of a vehicle 2200 that may operate in one or more automated driving modes (e.g., fully autonomous mode, semi-autonomous mode, driver assistance mode). As depicted, an automated vehicle, such as vehicle 2200, may include a number of sensors, to provide measurements and/or observations to be processed such as according to processes 350, 370, 450, 470 and/or 550. Although a particular pattern and/or a particular number of sensors is depicted in FIG. 6, subject matter is not limited in scope in these respects. For example, a system or device, such as vehicle 2200, may include any number of sensors in any of a wide range of arrangements and/or configurations. Also, although FIG. 6 is depicted as a two-dimensional representation, sensors of a vehicle capable of operating in one or more automated modes, for example, may generate signals and/or signal packets representative of conditions surrounding vehicle 2200 in a three-dimensional space. In implementations, one and/or two-dimensional sensor measurements may be combined and/or otherwise processed to produce a three-dimensional representation of conditions surrounding vehicle 2200, for example.

In implementations, various sensors may be mounted in vehicle 2200, for example, to capture observations and/or measurements for different portions of the environment around and/or adjacent to the vehicle. In implementations, vehicle 2200 may include multiple different sensors capable of detecting incoming signals, such as light signals, electromagnetic signals, and/or sound signals, for example. Individual sensors may have different fields of observation into an environment around vehicle 2200. Example fields of view 2210a through 2210h are depicted although, of course, subject matter is not limited in scope in these respects.

In implementations, sensor signals and/or signal packets may be utilized by at least one processor of vehicle 2200, for example, to identify objects and/or other environmental conditions in the vicinity of vehicle 2200 which may be utilized by a processing system of vehicle 2200 to autonomously guide the vehicle through the environment, for example. Example objects that may be detected in an environment surrounding a vehicle, such as vehicle 2200, may include other vehicles, trucks, cyclists, pedestrians, animals, rocks, trees, lampposts, guardrails, painted lines, signal lights, buildings, road signs, etc. Some objects may be stationary and other objects, such as pedestrians, may move through the environment.

In an implementation, one or more sensors of example vehicle 2200 may generate signals and/or signal packets that may be representative of at least a portion of the environment surrounding and/or adjacent to vehicle 2200. Other sensors may provide signals and/or signal packets representative of the speed, acceleration, orientation, position (e.g., via global navigation satellite system (GNSS), etc. of vehicle 2200. As described more fully below, sensor signals and/or signals packets may be processed, such as via a particle filter, to generate a plurality of particles. Such particles may be utilized, at least in part, to affect operation of vehicle 2200. In implementations, as vehicle 2200, for example, proceeds through an environment, sensor signals and/or signal states may be utilized, at least in part, to update a particle filter, for example, to further affect operation of the vehicle. As discussed more fully below, for a particle filter and/or the like to make use of the relatively extensive signals and/or signal packets being generated by the various sensors, any of a number of sorting operations may be performed on the sensor signals and/or signal packets.

In this context, "particle" refers to a digital representation, derived at least in part from sensor signals and/or signal packets, of an environmental condition for a particular point in a particular coordinate system for a particular point in time. For example, a particular particle may comprise an array of parameters describing a particular point within an environment surrounding vehicle 2200 at a particular point in time. In implementations, a "particle filter" and/or the like may be utilized to process sensor signals and/or signal packets to generate a plurality of particles describing an environment, such as an environment surrounding vehicle 2200. Of course, a particle filter is merely an example type of processing that may be performed on sensor signals and/or signal packets, and subject matter is not limited in scope in this respect.

In implementations, a particular coordinate system may be specified, although subject matter is not limited in scope to any particular coordinate system. In implementations, such a coordinate system may comprise a three-dimensional parameter space, although other implementations may specify other numbers of dimensions. In implementations, an individual particle may pertain to a particular location within a particular three dimensional space (e.g., X, Y, and Z axes).

Figure 7:
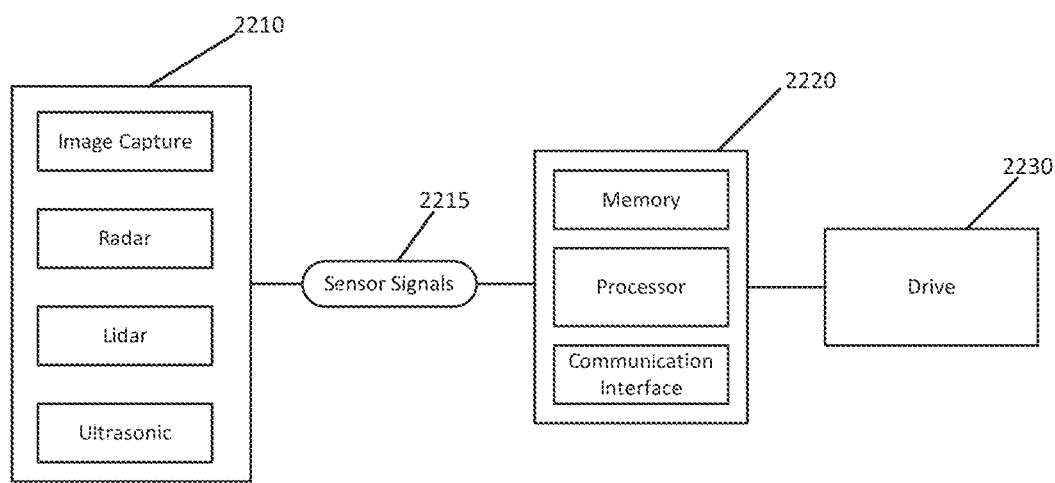
FIG. 7 depicts an example schematic block diagram of features of an example vehicle in a self-driving/automated driving application, in accordance with an embodiment.

FIG. 7 depicts an example schematic block diagram of example vehicle 2200. As mentioned, in implementations, vehicle 2200 may include a number of sensors 2210. Such sensors may include, for example, image capture (e.g., cameras), radar, lidar, and/or ultrasonic sensors, to name but a few non-limiting examples. In implementations, sensors 2210 may generate sensor signals and/or signal packets 2215 that may be provided to and/or otherwise obtained by a control system, such as control system 2220.

In implementations, control system 2220 may include at least one processor, at least one memory device and/or at least one communication interface, for example. In implementations, control system 2220 may include one or more central processing units (CPU), neural network processors (NNP) and/or graphics processing units (GPU), for example. In implementations, control system 2220 may process sensor signals and/or signal packets to generate signals and/or signal packets that may affect operation of vehicle 2200. For example, signals and/or signal packets may be generated by control system 2220 and may be provided to and/or otherwise obtained by a drive system 2230. In implementations, processing of sensor signals and/or signal packets by control system 2220 may include, for example, a particle filter, although other implementations may utilize other signal processing algorithms, techniques, approaches, etc. and subject matter is not limited in scope in this respect. In implementations, drive system 2230 may include devices, mechanisms, systems, etc. to affect operation of vehicle 2200, for example. As mentioned, as vehicle 2200 traverses an environment additional sensor signals and/or signal packets may be obtained and processed such that operation of vehicle 2200 may be updated over time.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A system comprising:
   a memory, the memory comprising one or more memory devices; and
   a direct memory access (DMA) controller coupled to the memory by a bus, the DMA controller configured to:
   receive one or more redirected write requests;
   execute a gather operation based, at least in part, on the received one or more redirected write requests, to obtain one or more words from the memory;
   transform the one or more words obtained from execution of the gather operation to one or more addresses in the memory; and
   execute a scatter operation to write data items to the one or more addresses in the memory.

2. The system of claim 1, wherein the memory is a first memory, wherein the system further comprises a second memory operable/serving as a buffer, wherein the buffer is configured to store values and/or states retrieved from the first memory, and wherein the DMA controller is further configured to parse the values and/or states in the buffer, to determine at least one address of the one or more addresses in the memory.

3. The system of claim 2, wherein the DMA controller is further configured to apply one or more arithmetic operations to at least one of the parsed values and/or states to determine the at least one address.

4. The system of claim 1, wherein the DMA controller is further configured to interpret the one or more redirected write requests as a request for the gather operation.

5. The system of claim 1, wherein the DMA controller is further configured to form a request for the scatter operation based, at least in part, on the one or more addresses in the memory.

6. The system of claim 1, further comprising an initiator configured to initiate the one or more redirected write requests, wherein the DMA controller is configured to execute the gather operation responsive to a signal from the initiator.

7. The system of claim 6, wherein the initiator of the one or more redirected write requests comprises a local memory or one or more registers of a compute node that is configured to receive sensor measurements and/or observations as data items in a signal stream.

8. A method executed by a direct memory access (DMA) controller, comprising:
executing a first gather operation based, at least in part, on one or more redirected read requests;
transforming one or more words obtained from execution of the first gather operation to one or more addresses; and
executing a second gather operation to forward data items located at the one or more addresses to a destination determined based, at least in part, on the one or more redirected read requests.

9. The method of claim 8, wherein transforming the one or more words obtained from execution of the first gather operation to the one or more addresses further comprises parsing values and/or states in a buffer to determine a memory address.

10. The method of claim 9, further comprising applying one or more arithmetic operations to the parsed values and/or states to determine the memory address.

11. The method of claim 8, further comprising interpreting the one or more redirected read requests as a first request for the first gather operation.

12. The method of claim 11, further comprising forming a second request for the second gather operation based, at least in part, on the one or more addresses.

13. The method of claim 8, further comprising executing the first gather operation in response to a signal from an initiator of the one or more redirected read requests.

14. The method of claim 13, wherein the initiator of the one or more redirected read requests comprises a process executed by an ALU to execute one or more sensor fusion operations.

15. A system comprising:
a memory, the memory comprising one or more memory devices; and
a direct memory access (DMA) controller coupled to the memory by a bus, the DMA controller configured to:
receive one or more redirected read requests;
execute a first gather operation based, at least in part, on the received one or more redirected read requests, to obtain one or more words from the memory;
transform the one or more words obtained from execution of the first gather operation to one or more addresses; and
execute a second gather operation to forward data items located at the one or more addresses to a destination determined based, at least in part, on the one or more redirected read requests.

16. The system of claim 15, wherein the DMA controller is further configured to parse values and/or states in a buffer to determine the one or more addresses.

17. The system of claim 15, wherein the DMA controller is further configured to:
parse values and/or states in a buffer; and
apply one or more arithmetic operations to the parsed values and/or states to determine the one or more memory addresses.

18. The system of claim 15, wherein the DMA controller is further configured to:
interpret the one or more redirected read requests as a request for the first gather operation.

19. The system of claim 15, wherein the DMA controller is further configured to form a request for the second gather operation based, at least in part, on the one or more addresses.

20. The system of claim 15, wherein the DMA controller is further configured to execute the first gather operation in response to a signal from an initiator of the one or more redirected read requests.

* * * * *